US012754356B2

(12) United States Patent
Sasata et al.

(10) Patent No.: US 12,754,356 B2
(45) Date of Patent: Oct. 6, 2026

(54) OPTICAL LAMINATE, LIGHT GUIDE ELEMENT, AND IMAGE DISPLAY APPARATUS

(71) Applicant: FUJIFILM Corporation, Tokyo (JP)

(72) Inventors: Katsumi Sasata, Minamiashigara (JP); Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 1005 days.

(21) Appl. No.: 17/704,200

(22) Filed: Mar. 25, 2022

(65) Prior Publication Data

US 2022/0214485 A1 Jul. 7, 2022

Related U.S. Application Data

(63) Continuation of application No. PCT/JP2020/036425, filed on Sep. 25, 2020.

(30) Foreign Application Priority Data

Sep. 27, 2019 (JP) ................................. 2019-177271

(51) Int. Cl.
*G02B 5/30* (2006.01)
*F21V 8/00* (2006.01)
*G02B 27/01* (2006.01)

(52) U.S. Cl.
CPC ......... *G02B 5/3016* (2013.01); *G02B 6/0023* (2013.01); *G02B 6/005* (2013.01);
(Continued)

(58) Field of Classification Search
CPC .... G02B 5/3016; G02B 6/0023; G02B 6/005; G02B 27/0172; G02B 2027/0123; G02B 2027/0178
See application file for complete search history.

(56) References Cited

U.S. PATENT DOCUMENTS

2002/0113923 A1* 8/2002 Kashima .............. G02B 5/3016 349/96
2013/0027656 A1 1/2013 Escuti et al.
(Continued)

FOREIGN PATENT DOCUMENTS

JP 2000-56115 A 2/2000
JP 2010-525394 A 7/2010
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/036425, dated Apr. 7, 2022.
(Continued)

*Primary Examiner* — Abdulmajeed Aziz
*Assistant Examiner* — Jessica M Apenteng
(74) *Attorney, Agent, or Firm* — Birch, Stewart, Kolasch & Birch, LLP

(57) ABSTRACT

Provided are an optical laminate where the occurrence of crosstalk can be suppressed and the occurrence of multiple images can be suppressed, a light guide element, and an image display apparatus. The optical laminate includes: a first cholesteric liquid crystal layer and a second cholesteric liquid crystal layer that are obtained by immobilizing a cholesteric liquid crystalline phase and have a liquid crystal alignment pattern in which a direction of an optical axis derived from a liquid crystal compound changes while continuously rotating in at least one in-plane direction, in the first and second cholesteric liquid crystal layers, turning directions of circularly polarized light to be reflected are opposite to each other, helical pitches $P_1$ and $P_2$ of the first and second cholesteric liquid crystal layers satisfy $P_1<P_2$, rotation directions of the direction of the optical axis derived
(Continued)

from the liquid crystal compound that continuously rotates in one in-plane direction in the liquid crystal alignment pattern are opposite to each other, and lengths $\Lambda_1$ and $\Lambda_2$ of the single periods of the first and second cholesteric liquid crystal layers satisfy $\Lambda_1<\Lambda_2$.

20 Claims, 6 Drawing Sheets

(52) U.S. Cl.
CPC .. *G02B 27/0172* (2013.01); *G02B 2027/0123* (2013.01); *G02B 2027/0178* (2013.01)

(56) References Cited

U.S. PATENT DOCUMENTS

| | | | | |
|---|---|---|---|---|
| 2019/0243045 | A1 * | 8/2019 | Inada | G02B 27/286 |
| 2020/0326579 | A1 | 10/2020 | Sato et al. | |

FOREIGN PATENT DOCUMENTS

| | | | | |
|---|---|---|---|---|
| WO | WO 98/20391 A1 | | 5/1998 | |
| WO | WO 2016/066219 A1 | | 5/2016 | |
| WO | WO-2019131966 A1 | * | 7/2019 | G02B 27/02 |

OTHER PUBLICATIONS

International Search Report (Form PCT/ISA/210) for International Application No. PCT/JP2020/036425, dated Dec. 8, 2020, with English translation.

Kress et al., "Towards the Ultimate Mixed Reality Experience: HoloLens Display Architecture Choices," SID 2017 Digest, 2017, pp. 127-131.

Japanese Office Action for corresponding Japanese Application No. 2021-548461, dated May 9, 2023, with English translation.

* cited by examiner

OPTICAL LAMINATE, LIGHT GUIDE ELEMENT, AND IMAGE DISPLAY APPARATUS

CROSS-REFERENCE TO RELATED APPLICATIONS

This application is a Continuation of PCT International Application No. PCT/JP2020/036425 filed on Sep. 25, 2020, which claims priority under 35 U.S.C. § 119(a) to Japanese Patent Application No. 2019-177271 filed on Sep. 27, 2019. The above application is hereby expressly incorporated by reference, in its entirety, into the present application.

BACKGROUND OF THE INVENTION

1. Field of the Invention

The present invention relates to an optical laminate that reflects light, a light guide element including the optical element, and an image display apparatus including the optical laminate.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end part of a light guide plate. As a result, the light is introduced into the light guide plate at an angle such that the light is totally reflected and propagates in the light guide plate. The light propagated in the light guide plate is also diffracted by the diffraction element in the other end part of the light guide plate and is emitted from the light guide plate to an observation position by the user.

As an example of a diffraction element that is used for AR glasses and allows light to be incident into a light guide plate at an angle, a reflective structure described in WO2016/066219A including a cholesteric liquid crystal layer that is obtained by immobilizing a cholesteric liquid crystalline phase can be used.

This reflective structure includes a plurality of helical structures each of which extends in a predetermined direction. In addition, this reflective structure includes: a first incident surface that intersects the predetermined direction and into which light is incident; and a reflecting surface that intersects the predetermined direction and reflects the light incident from the first incident surface, in which the first incident surface includes one of two end parts in each of the plurality of helical structures. In addition, each of the plurality of helical structures includes a plurality of structural units that lies in the predetermined direction, and each of the plurality of structural units includes a plurality of elements that are helically turned and laminated. In addition, each of the plurality of structural units includes a first end part and a second end part, the second end part of one structural unit among structural units adjacent to each other in the predetermined direction forms the first end part of the other structural unit, and alignment directions of the elements positioned in the plurality of first end parts included in the plurality of helical structures are aligned. Further, the reflecting surface includes at least one first end part included in each of the plurality of helical structures and is not parallel to the first incident surface.

A reflective structure (cholesteric liquid crystal layer) described in WO2016/066219A has a liquid crystal alignment pattern in which a direction of an optical axis derived from the liquid crystal compound changes while continuously rotating in at least one in-plane direction. The cholesteric liquid crystal layer described in WO2016/066219A has the above-described liquid crystal alignment pattern to include the reflecting surface that is not parallel to the first incident surface.

A general cholesteric liquid crystal layer reflects incident light by specular reflection.

On the other hand, the reflective structure described in WO2016/066219A reflects incident light with an angle in the predetermined direction with respect to specular reflection instead of specular reflection. For example, in the cholesteric liquid crystal layer described in WO2016/066219A, light incident from the normal direction is reflected with an angle with respect to the normal direction instead of being reflected in the normal direction.

Accordingly, by using this optical element, an image formed by a display is diffracted, light is introduced into a light guide plate at an angle, and the light can be guided in the light guide plate.

SUMMARY OF THE INVENTION

However, in a case where color display is performed in AR glasses, for example, cholesteric liquid crystal layers that reflect light components of respective colors of RGB are laminated such that light components of respective color of RGB are reflected by the cholesteric liquid crystal layers.

According to an investigation, the present inventors found that, in a case where cholesteric liquid crystal layers that reflect light components having different wavelengths are laminated to be used, there is a problem in that some light is diffracted by an unexpected cholesteric liquid crystal layer such that the light is diffracted at an angle different from a designed angle and a phenomenon (also referred to as "crosstalk") where the light is seen as double (multiple) images) occurs. For example, a part of blue light (B light) is also reflected from a cholesteric liquid crystal layer that reflects green light (G light). In a case where B light is reflected from a cholesteric liquid crystal layer for G light, the B light is diffracted at an angle different from that in a case where B is reflected from a cholesteric liquid crystal layer for B light. Therefore, a phenomenon where double images are seen by the B light reflected from the cholesteric liquid crystal layer for B light and the B light reflected from the cholesteric liquid crystal layer for G light may occur.

An object of the present invention is to solve the above-described problem of the related art and to provide: an optical laminate where the occurrence of crosstalk can be suppressed; a light guide element including the optical laminate such that the occurrence of multiple images can be suppressed, for example, in a case where the light guide element is used in AR glasses; and an image display apparatus including the light guide element.

In order to achieve the object, the present invention has the following configurations.

[1] An optical laminate comprising:

a first cholesteric liquid crystal layer and a second cholesteric liquid crystal layer that are obtained by immobilizing a cholesteric liquid crystalline phase and have a liquid crystal alignment pattern in which a direction of an optical axis derived from a liquid crystal compound changes while continuously rotating in at least one in-plane direction, in which in the first cholesteric liquid crystal layer and the second cholesteric liquid crystal layer, turning directions of circularly polarized light to be reflected are opposite to each other, helical pitches as lengths in a thickness direction over which the liquid crystal compound that is helically turned and laminated in the cholesteric liquid crystalline phase turns by 360° are different from each other, rotation directions of the direction of the optical axis derived from the liquid crystal compound that continuously rotates in at least one in-plane direction in the liquid crystal alignment pattern are opposite to each other, in a case where a helical pitch of the first cholesteric liquid crystal layer is represented by $P_1$ and a helical pitch of the second cholesteric liquid crystal layer is represented by $P_2$, $P_1<P_2$, and in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, a length of the single period of the first cholesteric liquid crystal layer is represented by $\Lambda_1$, and a length of the single period of the second cholesteric liquid crystal layer is represented by $\Lambda_2$, $\Lambda_1<\Lambda_2$.

[2] The optical laminate according to [1], further comprising:

a third cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction, in which in the first and third cholesteric liquid crystal layers and the second cholesteric liquid crystal layer, turning directions of circularly polarized light to be reflected are opposite to each other, helical pitches as lengths in a thickness direction over which the liquid crystal compound that is helically turned and laminated in the cholesteric liquid crystalline phase turns by 360° are different from each other, rotation directions of the direction of the optical axis derived from the liquid crystal compound that continuously rotates in at least one in-plane direction in the liquid crystal alignment pattern are opposite to each other, in a case where a helical pitch of the third cholesteric liquid crystal layer is represented by $P_3$, $P_1<P_2<P_3$, and in a case where a length of the single period of the third cholesteric liquid crystal layer is represented by $\Lambda_3$, $\Lambda_1<\Lambda_2<\Lambda_3$.

[3] The optical laminate according to [1] or [2], in which in the liquid crystal alignment pattern of the first cholesteric liquid crystal layer and the liquid crystal alignment pattern of the second cholesteric liquid crystal layer, the direction of the optical axis derived from the liquid crystal compound changes while continuously rotating only in the one in-plane direction, and in the liquid crystal alignment pattern of the first cholesteric liquid crystal layer and the liquid crystal alignment pattern of the second cholesteric liquid crystal layer, the one in-plane directions are the same.

[4] The optical laminate according to [2], in which in each of the liquid crystal alignment pattern of the first cholesteric liquid crystal layer, the liquid crystal alignment pattern of the second cholesteric liquid crystal layer, and the liquid crystal alignment pattern of the third cholesteric liquid crystal layer, the direction of the optical axis derived from the liquid crystal compound changes while continuously rotating only in one in-plane direction, and in the liquid crystal alignment pattern of the first cholesteric liquid crystal layer, the liquid crystal alignment pattern of the second cholesteric liquid crystal layer, and the liquid crystal alignment pattern of the third cholesteric liquid crystal layer, the one in-plane directions are the same.

[5] A light guide element comprising:

a light guide plate; and the optical laminate according to any one of [1] to [4] that is provided on the light guide plate.

[6] An image display apparatus comprising:

the light guide element according to [5]; and a display element that emits an image to the optical laminate of the light guide element.

[7] The image display apparatus according to [6], in which the display element emits circularly polarized light to the optical laminate.

[8] The image display apparatus according to [7], in which the display element emits circularly polarized light having a turning direction that varies depending on display colors to the optical laminate.

According to the present invention, it is possible to provide: an optical laminate where the occurrence of crosstalk can be suppressed; a light guide element including the optical laminate such that the occurrence of multiple images can be suppressed, for example, in a case where the light guide element is used in AR glasses; and an image display apparatus including the light guide element.

DESCRIPTION OF THE PREFERRED EMBODIMENTS

Hereinafter, an optical laminate, a light guide element, and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light which can be observed by human eyes among electromagnetic waves and refers to light in a wavelength range of 380 to 780 nm. Invisible light refers to light in a wavelength range of shorter than 380 nm and longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

Figure 1:
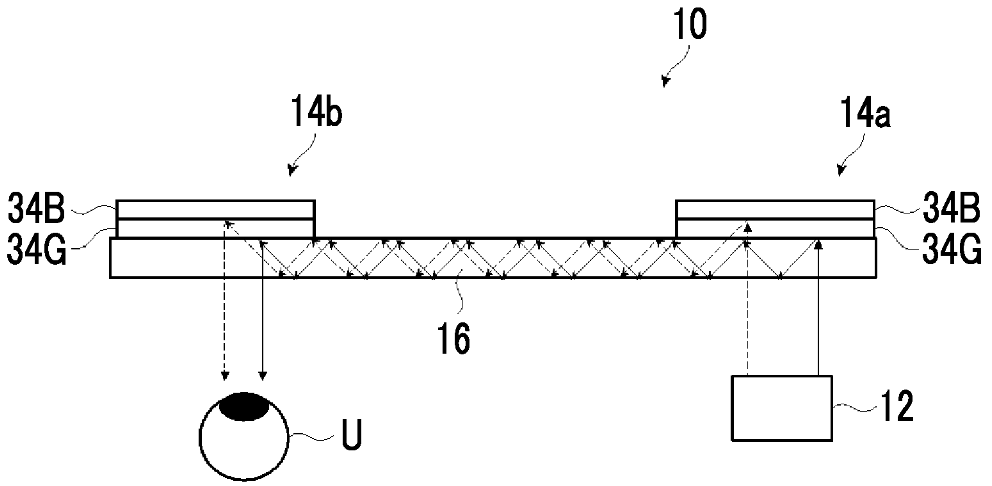
FIG. 1 is a diagram conceptually showing an example of an image display apparatus according to the present invention including an optical laminate and a light guide element according to the present invention.

FIG. 1 conceptually shows an example of the image display apparatus according to the embodiment of the present invention including the light guide element according to the embodiment of the present invention. The light guide element according to the embodiment of the present invention includes the optical laminate according to the embodiment of the present invention.

The image display apparatus 10 shown in FIG. 1 is used as AR glasses as a preferable example. The optical laminate and the light guide element according to the embodiment of the present invention can also be used not only as AR glasses but also as an optical element such as a transparent screen, a lighting device (including a backlight or the like of a liquid crystal display), or a sensor. In addition, the image display apparatus according to the embodiment of the present invention can also be used as an image display apparatus including the optical element.

The image display apparatus 10 shown in FIG. 1 includes a display element 12, optical laminates **14*a* and 14*b*, and a light guide plate 16. The optical laminates 14*a* and 14*b* are bonded to be spaced from end parts on the same surface of the light guide plate 16 in a longitudinal direction, the optical laminate 14*a* is on the display element 12 side, and the optical laminate 14*b*** is on an image display side.

[Display Element]

The display element 12 displays an image (video) to be observed by a user U and emits the image to the optical laminate **14*a*** through a light guide plate.

In the image display apparatus 10 according to the embodiment of the present invention, as the display element 12, various well-known display elements (a display device or a projector) used for AR glasses or the like can be used without any particular limitation. In the example shown in the drawing, the display element 12 includes a display 20 and a projection lens 24 (refer to FIG. 8).

In the image display apparatus 10 according to the embodiment of the present invention, the display 20 is not particularly limited. For example, various well-known displays used in AR glasses or the like can be used.

Examples of the display 20 include a liquid crystal display (LCOS including Liquid Crystal On Silicon), an organic electroluminescent display, digital light processing (DLP), and a laser scanning display (LSD).

The display 20 is not particularly limited as long as it displays an image having two or more colors, and may display a color image. For example, the image display apparatus 10 in the example shown in the drawing displays a two-color image of green and blue, and the display 20 displays a two-color image of green and blue.

In the display element 12 used in the image display apparatus 10 according to the embodiment of the present invention, the projection lens 24 is also a well-known projection lens (condenser lens) used for AR glasses or the like.

Here, in the image display apparatus 10 according to the embodiment of the present invention, it is preferable that the display element 12 emits circularly polarized light.

Accordingly, in a case where the display 20 emits an unpolarized light image, and it is preferable that the display element 12 includes, for example, a circular polarization plate including a linear polarizer and an λ/4 plate. In addition, in a case where the display 20 emits a linearly polarized light image, it is preferable that the display element 12 includes, for example, a λ/4 plate.

In the example shown in the drawing, the display element 12 emits circularly polarized light having a turning direction that varies depending on display colors. For example, blue light is emitted as right circularly polarized light, and green light is emitted as left circularly polarized light. This point will be described below.

In addition, in order to improve visibility for the optical laminate and the image display apparatus according to the embodiment of the present invention, a diffractive optical method of enlarging an exit pupil may be used. Specifically, an optical method of using a plurality of diffractive elements (optical laminates), that is, an optical method of using in-coupling, intermediate and out-coupling diffractive element can be used. This method is described in detail in JP2008-546020A.

[Light Guide Plate]

In the image display apparatus 10, the light guide plate 16 is a well-known light guide plate that reflects light incident thereinto and guides (propagates) the reflected light. The light guide element according to the embodiment of the present invention is configured with the light guide plate 16 and the optical laminate **14*a* and/or the optical laminate 14*b***.

As the light guide plate 16, various light guide plates used for a backlight unit or the like of AR glasses or a liquid crystal display can be used without any particular limitation.

[Optical Laminate]

The optical laminates **14*a* and 14*b* are the optical laminates according to the embodiment of the present invention. In the following description, the optical laminate 14*a* and the optical laminate 14*b* will be collectively referred to as "optical laminate 14**".

The optical laminate 14*a* and the optical laminate 14*b* are disposed on the light guide plate 16 such that rotation directions of an optical axis 40A of a liquid crystal compound 40 in an in-plane direction (arrow X direction described below) in a liquid crystal alignment pattern of a cholesteric liquid crystal layer are opposite to each other.

In the image display apparatus 10 (the light guide element in the example shown in the drawing), the optical laminates 14 are arranged at both end parts of the same surface of the light guide plate 16 in a longitudinal direction.

Although not shown in the drawing, the optical laminates 14 are bonded to the light guide plate through a bonding layer.

In the present invention, as the bonding layer, any layer formed of one of various well-known materials can be used as long as it is a layer that can bond materials as bonding targets. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, the optical laminates 14 and the light guide plate 16 may be laminated and held by a frame, a jig, or the like to configure the light guide element according to the embodiment of the present invention.

Alternatively, the optical laminates 14 may be directly formed on the light guide plate 16.

The optical laminate 14 shown in FIG. 1 includes: a B reflection cholesteric liquid crystal layer 34B that selectively reflects blue light (B light); and a G reflection cholesteric liquid crystal layer 34G that selectively reflects green light (G light). The B reflection cholesteric liquid crystal layer 34B corresponds to the first cholesteric liquid crystal layer according to the embodiment of the present invention, and the G reflection cholesteric liquid crystal layer 34G corresponds to the first cholesteric liquid crystal layer according to the embodiment of the present invention. As described below, the optical laminate 14 may include a support and an alignment film for forming the cholesteric liquid crystal layer.

In the present invention, in the B reflection cholesteric liquid crystal layer (the first cholesteric liquid crystal layer) and the G reflection cholesteric liquid crystal layer (the second cholesteric liquid crystal layer), turning directions of circularly polarized light to be reflected are opposite to each other, helical pitches as lengths in a thickness direction over which the liquid crystal compound that is helically turned and laminated in the cholesteric liquid crystalline phase turns by 360° are different from each other, rotation directions of the direction of the optical axis derived from the liquid crystal compound that continuously rotates in at least one in-plane direction in the liquid crystal alignment pattern are opposite to each other, in a case where a helical pitch of the first cholesteric liquid crystal layer is represented by $P_1$ and a helical pitch of the second cholesteric liquid crystal layer is represented by $P_2$, $P_1<P_2$, and in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, a length of the single period of the first cholesteric liquid crystal layer is represented by $\Lambda_1$, and a length of the single period of the second cholesteric liquid crystal layer is represented by $\Lambda_2$, $\Lambda_1<\Lambda_2$.

This point will be described below.

Regarding the cholesteric liquid crystal layer including the optical laminate according to the embodiment of the present invention, first, the B reflection cholesteric liquid crystal layer 34B shown in FIG. 2 will be described as an example.

Figure 2:
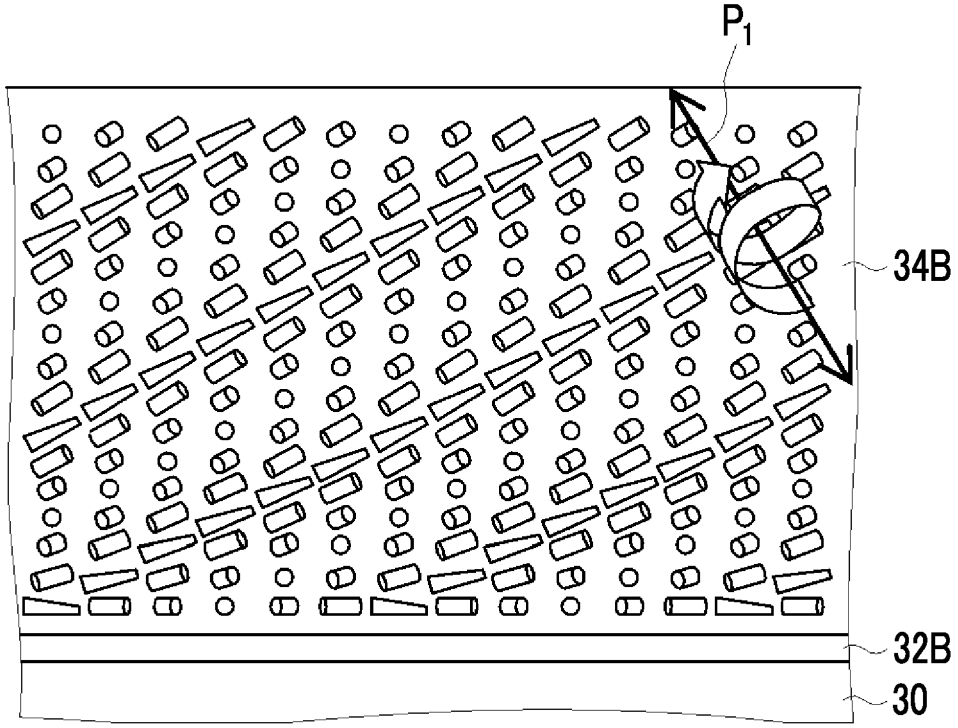
FIG. 2 is a diagram conceptually showing an example of a B reflection cholesteric liquid crystal layer forming the optical laminate according to the present invention.

FIG. 2 conceptually shows a laminate including the B reflection cholesteric liquid crystal layer 34B and a laminate and an alignment film for forming the B reflection cholesteric liquid crystal layer 34B. The laminate shown in FIG. 2 includes a support 30, an alignment film 32B, and the B reflection cholesteric liquid crystal layer 34B.

The laminate shown in FIG. 2 includes the support 30, the alignment film 32B, and the B reflection cholesteric liquid crystal layer 34B, and the optical laminate 14 may obtained by peeling off the support 30 from a laminate where the alignment film 32, the B reflection cholesteric liquid crystal layer 34B, and the G reflection cholesteric liquid crystal layer 34G are laminated. Alternatively, the laminate may be obtained by peeling off the support 30 and the alignment film 32 from a laminate where the B reflection cholesteric liquid crystal layer 34B and the G reflection cholesteric liquid crystal layer 34G are laminated. This point is also applicable to the G reflection cholesteric liquid crystal layer 34G and a R reflection cholesteric liquid crystal layer 34R described below.

<Support>

In the laminate shown in FIG. 2, the support 30 supports the alignment film 32B and the B reflection cholesteric liquid crystal layer 34B.

As the support 30, various sheet-shaped materials (films or plate-shaped materials) can be used as long as they can support the alignment film 32B and the B reflection cholesteric liquid crystal layer 34B.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the optical laminate 14, a material for forming the support 30, and the like in a range where the alignment film 32B and the B reflection cholesteric liquid crystal layer 34B can be supported.

The thickness of the support 30 is preferably 1 to 1000 μm, more preferably 3 to 250 μm, and still more preferably 5 to 150 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

In the laminate shown in FIG. 2, the alignment film 32B is formed on a surface of the support 30.

In a case where the alignment film 32B and the B reflection cholesteric liquid crystal layer 34B are formed, the alignment film 32B is an alignment film for aligning a liquid crystal compound 40 to the predetermined liquid crystal alignment pattern.

Although described below, the B reflection cholesteric liquid crystal layer 34B has the liquid crystal alignment pattern in which the direction of the optical axis 40A (refer to FIG. 3) derived from the liquid crystal compound 40 changes while continuously rotating in one in-plane direction. Accordingly, the alignment film 32B is formed such that the B reflection cholesteric liquid crystal layer 34B can form the liquid crystal alignment pattern.

In the following description, "the direction of the optical axis 40A rotates" will also be simply referred to as "the optical axis 40A rotates".

In the optical laminate 14 according to the embodiment of the present invention, for example, the alignment film 32B can be suitably used as a so-called photo-alignment film obtained by irradiating a photo-alignment material with polarized light or non-polarized light. That is, in the optical laminate 14 according to the embodiment of the present invention, a photo-alignment film that is formed by applying a photo-alignment material to the support 30 is suitably used as the alignment film 32B.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32B is not particularly limited. The thickness with which a required alignment function can be obtained may be appropriately set depending on the material for forming the alignment film 32B.

The thickness of the alignment film 32B is preferably 0.005 to 5 μm and more preferably 0.01 to 2 μm.

A method of forming the alignment film 32B is not limited. Any one of various well-known methods corresponding to a material for forming the alignment film 32B can be used. For example, a method including: applying the alignment film 32B to a surface of the support 30; drying the applied alignment film 32B; and exposing the alignment film 32B to laser light to form an alignment pattern can be used.

Figure 3:
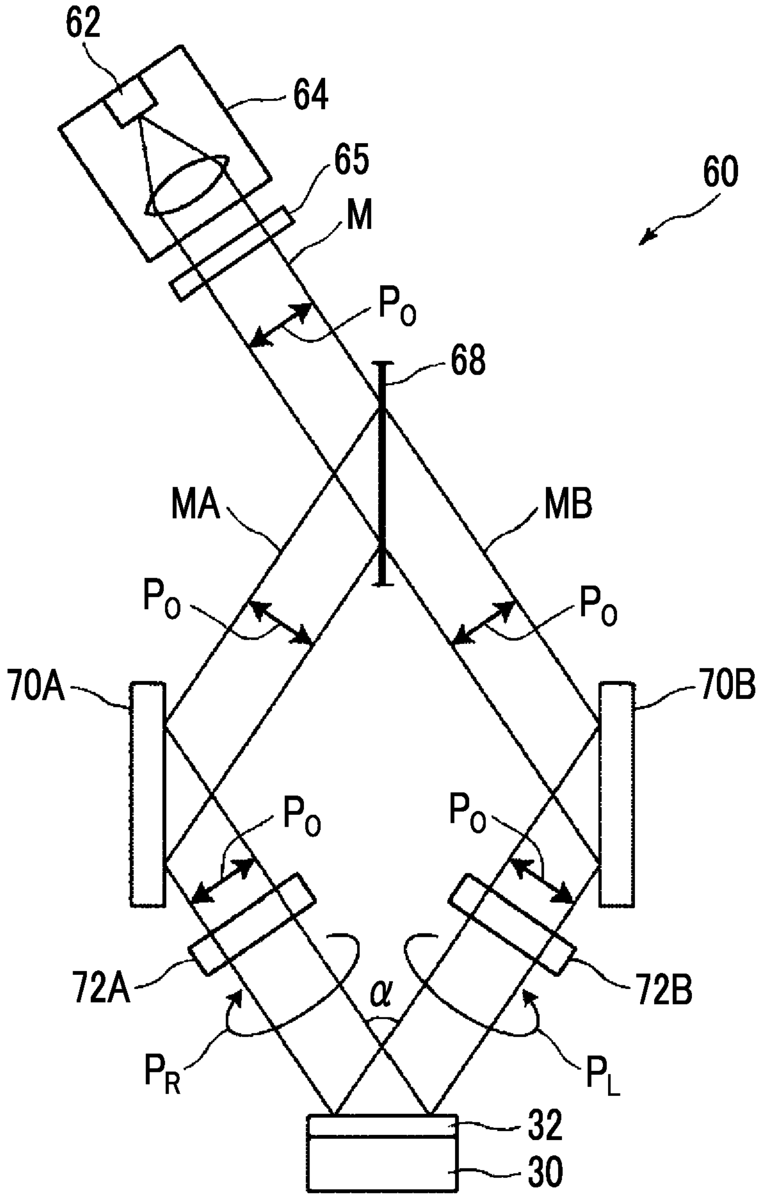
FIG. 3 is a conceptual diagram showing an example of an exposure device that exposes an alignment film.

FIG. 3 conceptually shows an example of an exposure device that exposes the alignment film 32B to form an alignment pattern.

An exposure device 60 shown in FIG. 3 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere each other on the alignment film 32, and the alignment film 32 is irradiated with and exposed to the interference light.

Due to the interference in this case, the polarization state of light with which the alignment film 32 is irradiated periodically changes according to interference fringes. As a result, in the alignment film 32, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted. By forming the cholesteric liquid crystal layer on the alignment film 32 having the alignment pattern in which the alignment state periodically changes, as described below, the cholesteric liquid crystal layer having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

In the optical laminate according to the embodiment of the present invention, the alignment film 32B is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the B reflection cholesteric liquid crystal layer 34B or the like has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

<B Reflection Cholesteric Liquid Crystal Layer>

In the laminate shown in FIG. 2, the B reflection cholesteric liquid crystal layer 34B is formed on a surface of the alignment film 32B.

The B reflection cholesteric liquid crystal layer 34B is obtained by immobilizing a cholesteric liquid crystalline phase. That is, the B reflection cholesteric liquid crystal layer 34B is a layer formed of the liquid crystal compound 40 (liquid crystal material) having a cholesteric structure.

The cholesteric liquid crystal layer has a helical structure in which the liquid crystal compound 40 is helically turned and laminated obtained by immobilizing a typical cholesteric liquid crystalline phase. In the helical structure, a configuration in which the liquid crystal compound 40 is helically turned once (rotated by 360) and laminated is set as one helical pitch, and plural pitches of the helically turned liquid crystal compound 40 are laminated. That is, one helical pitch is a pitch $P_1$ shown in FIG. 1.

In other words, one helical pitch refers to the length of one helical winding, that is, the length in a helical axis direction in which a director (optical axis, in a rod-like liquid crystal, a major axis direction) of the liquid crystal compound constituting the cholesteric liquid crystalline phase rotates by 360°.

In a case where a cross-section of the B reflection cholesteric liquid crystal layer 34B is observed with a scanning electron microscope (SEM), a stripe pattern including bright portions (bright lines) and dark portions (dark lines) derived from a cholesteric liquid crystalline phase is observed. That is, in the cross-section of the B reflection cholesteric liquid crystal layer 34B, a layered structure in which the bright portions and the dark portions are alternately laminated in the thickness direction is observed.

In the cholesteric liquid crystalline phase, a structure in which the bright portion and the dark portion are repeated twice corresponds to one helical pitch. The structure in which the bright portion B and the dark portion D are repeated twice includes three dark portions (bright portions) and two bright portions (dark portions) (refer to FIG. 5). Therefore, one helical pitch (pitch $P_1$) of the B reflection cholesteric liquid crystal layer 34B, that is, the reflective layer can be measured from a SEM cross-sectional view.

<<Cholesteric Liquid Crystalline Phase>>

It is known that the cholesteric liquid crystalline phase exhibits selective reflectivity at a specific wavelength.

A center wavelength of selective reflection (selective reflection center wavelength) λ of a general cholesteric liquid crystalline phase depends on the length (pitch P, refer to FIGS. 2 and 5) of one helical pitch in the cholesteric liquid crystalline phase and satisfies a relationship of $\lambda = n \times P$ with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the pitch P increases.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions. In the case of the B reflection cholesteric liquid crystal layer 34B, the kind of the chiral agent and the addition concentration of the chiral agent may be adjusted such that the helical pitch has a selective reflection center wavelength in a blue wavelength range.

The details of the adjustment of the pitch can be found in "Fuji Film Research & Development" No. 50 (2005), p. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

The B reflection cholesteric liquid crystal layer 34B shown in FIG. 2 has a right helical twisted direction, and thus reflects right circularly polarized light in a blue wavelength range.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection wavelength range (circularly polarized light reflection wavelength range) where selective reflection is exhibited depends on Δn of the cholesteric liquid crystalline phase and the helical pitch P and complies with a relationship of $\Delta\lambda = \Delta n \times P$. Therefore, the width of the selective reflection wavelength range can be controlled by adjusting Δn. Δn can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical laminate and may be, for example, 10 to 500 nm and is preferably 20 to 300 nm and more preferably 30 to 100 nm.

<<Liquid Crystal Alignment Pattern of B Reflection Cholesteric Liquid Crystal Layer>>

The B reflection cholesteric liquid crystal layer 34B according to the embodiment of the present invention has the liquid crystal alignment pattern in which the direction of the optical axis 40A derived from the liquid crystal compound 40 forming the cholesteric liquid crystalline phase changes while continuously rotating in the one in-plane direction of the B reflection cholesteric liquid crystal layer 34B.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is along a rod-like major axis direction. In the following description, the optical axis 40A derived from the liquid crystal compound 40 will also be referred to as "the optical axis 40A of the liquid crystal compound 40" or "the optical axis 40A".

Figure 4:
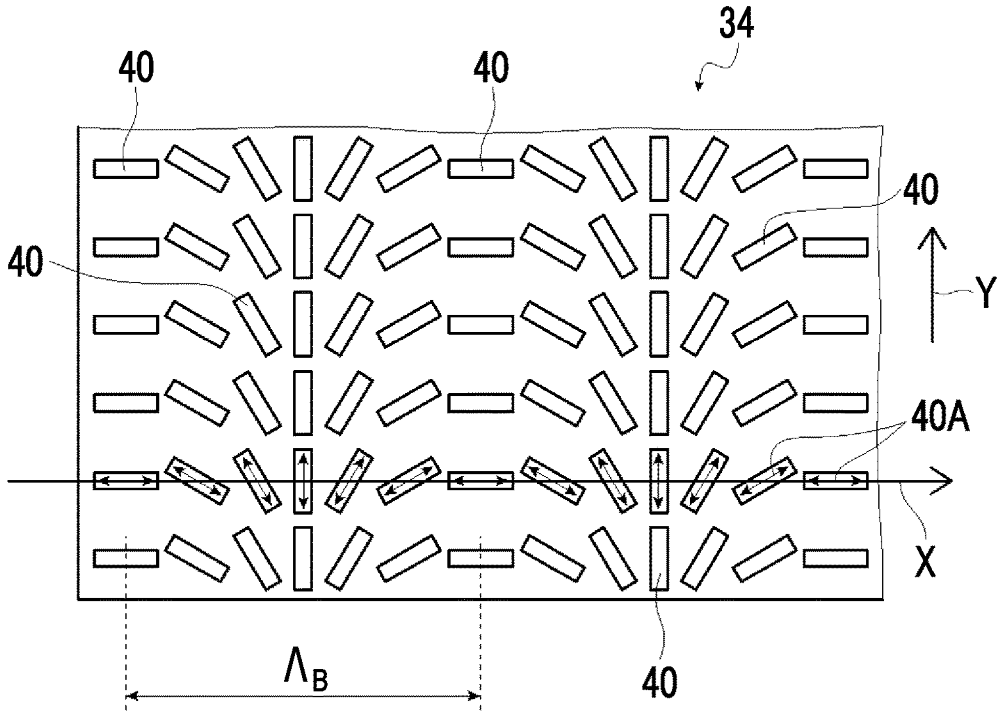
FIG. 4 is a plan view showing a cholesteric liquid crystal layer of the optical laminate shown in FIG. 2.

FIG. 4 conceptually shows a plan view of the B reflection cholesteric liquid crystal layer 34B.

The plan view is a view in a case where the B reflection cholesteric liquid crystal layer 34B is seen from the top in FIG. 2, that is, a view in a case where the laminate shown in FIG. 2 is seen from a thickness direction (laminating direction of the respective layers (films)).

In addition, in FIG. 4, in order to clarify the configuration of the B reflection cholesteric liquid crystal layer 34B, only the liquid crystal compound 40 on the surface of the alignment film 32B is shown.

As shown in FIG. 4, on the surface of the alignment film 32B, the liquid crystal compound 40 forming the B reflection cholesteric liquid crystal layer 34B is two-dimensionally arranged according to the alignment pattern formed on the alignment film 32B as the lower layer in a predetermined in-plane direction indicated by arrow X and a direction perpendicular to the one in-plane direction (arrow X direction).

In the following description, the direction perpendicular to the arrow X direction will be referred to as "Y direction" for convenience of description. That is, in FIGS. 2 and 5 and FIG. 6 described below, the Y direction is a direction perpendicular to the paper plane.

In addition, the liquid crystal compound 40 forming the B reflection cholesteric liquid crystal layer 34B has the liquid crystal alignment pattern in which the direction of the optical axis 40A changes while continuously rotating in the arrow X direction in a plane of the B reflection cholesteric liquid crystal layer 34B. In the example shown in the drawing, the liquid crystal compound 40 has the liquid crystal alignment pattern in which the optical axis 40A of the liquid crystal compound 40 changes while continuously rotating clockwise in the arrow X direction.

Specifically, "the direction of the optical axis 40A of the liquid crystal compound 40 changes while continuously rotating in the arrow X direction (the predetermined one in-plane direction)" represents that an angle between the optical axis 40A of the liquid crystal compound 40, which is arranged in the arrow X direction, and the arrow X direction varies depending on positions in the arrow X direction, and the angle between the optical axis 40A and the arrow X direction sequentially changes from $\theta$ to $\theta+180°$ or $\theta-180°$ in the arrow X direction.

A difference between the angles of the optical axes 40A of the liquid crystal compound 40 adjacent to each other in the arrow X direction is preferably 45° or less, more preferably 15° or less, and still more preferably less than 15°.

On the other hand, in the liquid crystal compound 40 forming the B reflection cholesteric liquid crystal layer 34B, the directions of the optical axes 40A are the same in the Y direction perpendicular to the arrow X direction, that is, the Y direction perpendicular to the one in-plane direction in which the optical axis 40A continuously rotates.

In other words, in the liquid crystal compound 40 forming the B reflection cholesteric liquid crystal layer 34B, angles between the optical axes 40A of the liquid crystal compound 40 and the arrow X direction are the same in the Y direction.

In the present invention, in the liquid crystal alignment pattern of the liquid crystal compound 40, the length (distance) over which the optical axis 40A of the liquid crystal compound 40 rotates by 180° in the arrow X direction in which the optical axis 40A changes while continuously rotating in a plane is the length $\Lambda$ of the single period in the liquid crystal alignment pattern. That is, a distance between centers of two liquid crystal compounds 40 in the arrow X direction is the length $\Lambda$ of the single period, the two liquid crystal compounds having the same angle in the arrow X direction.

Specifically, as shown in FIG. 4, a distance of centers in the arrow X direction of two liquid crystal compounds 40 in which the arrow X direction and the direction of the optical axis 40A match each other is the length $\Lambda$ of the single period. In the following description, the length $\Lambda$ of the single period will also be referred to as "single period $\Lambda$".

In the present invention, in the liquid crystal alignment pattern of the B reflection cholesteric liquid crystal layer 34B, the single period $\Lambda$ is repeated in the arrow X direction, that is, in the one in-plane direction in which the direction of the optical axis 40A changes while continuously rotating.

The cholesteric liquid crystal layer obtained by immobilizing a cholesteric liquid crystalline phase typically reflects incident light (circularly polarized light) by specular reflection.

On the other hand, the B reflection cholesteric liquid crystal layer 34B reflects incidence light in a direction having an angle in the arrow X direction with respect to the incidence light. The B reflection cholesteric liquid crystal layer 34B has the liquid crystal alignment pattern in which the optical axis 40A changes while continuously rotating in the arrow X direction in a plane (the predetermined in-plane direction).

As described above, the B reflection cholesteric liquid crystal layer 34B reflects right circularly polarized light $B_R$ in a blue wavelength range.

Accordingly, in a case where light is incident into the B reflection cholesteric liquid crystal layer 34B, the B reflection cholesteric liquid crystal layer 34B reflects only the right circularly polarized light $B_R$ in the blue wavelength range and allows transmission of the other light.

A typical cholesteric liquid crystal layer not having the liquid crystal alignment pattern in a plane reflects incident circularly polarized light by specular reflection.

On the other hand, in the B reflection cholesteric liquid crystal layer 34B has the liquid crystal alignment pattern in which the optical axis 40A changes while continuously rotating in the arrow X direction in a plane, incident circularly polarized light is reflected in a direction opposite to the arrow X direction with respect to specular reflection.

In a cross-section of the cholesteric liquid crystalline phase observed with a SEM, a stripe pattern including bright portions and dark portions derived from the cholesteric liquid crystalline phase is observed.

As is well known, the bright portions and the dark portions of the cholesteric liquid crystalline phase are formed to connect the liquid crystal compounds 40 that are helically turned and in which the directions of the optical axes 40A match with each other in the turning direction.

Here, bright portions and dark portions of a typical cholesteric liquid crystal layer are parallel to the main surface, that is, the alignment surface that is the formation surface.

On the other hand, the B reflection cholesteric liquid crystal layer 34B has the liquid crystal alignment pattern in which the optical axis 40A changes while continuously rotating in the arrow X direction in a plane. Accordingly, as conceptually shown in FIG. 5, bright portions B and dark portions D of the B reflection cholesteric liquid crystal layer 34B are tilted to rise in the arrow X direction with respect to the main surface, that is, the alignment film 32 according to the arrangement of the liquid crystal compounds 40 in which the directions of the optical axes 40A match with each other in the helical turning.

By reversing the rotation direction of the optical axis 40A of the liquid crystal compound 40 toward the arrow X direction, a reflection direction of the right circularly polarized light $B_R$ can be reversed. That is, in FIGS. 2 and 4, the rotation direction of the optical axis 40A toward the arrow X direction is counterclockwise, and the blue right circularly polarized light $B_R$ is reflected in a state where it is tilted in a direction opposite to the arrow X direction. By setting the rotation direction of the optical axis 40A to be clockwise, the tilt direction of the bright portions B and the dark portions D is reversed, and the blue right circularly polarized light $B_R$ is reflected in a state where it is tilted in the arrow X direction. In other words, this aspect is the same as a case where the arrow X direction in which the optical axis 40A rotates counterclockwise is reversed.

Further, as described above, in the cholesteric liquid crystal layer that reflects right circularly polarized light and the cholesteric liquid crystal layer that reflects left circularly polarized light, the helical turning directions of the liquid crystal compounds 40 are opposite to each other. Accordingly, in the cholesteric liquid crystal layer that reflects left circularly polarized light and have the liquid crystal alignment pattern in which the optical axis 40A rotates clockwise in the arrow X direction as in the example shown in the drawing, the tilt direction of the bright portions B and the dark portions D is opposite, and thus the left circularly polarized light is reflected toward a direction opposite to the arrow X direction.

In the B reflection cholesteric liquid crystal layer 34B, as the single period $\Lambda_B$ of the liquid crystal alignment pattern in which the optical axis 40A continuously rotates in a plane decreases, the above-described tilt angle of reflected light with respect to incidence light increases. That is, as the single period $\Lambda_B$ decreases, reflected light can be reflected in a state where it is largely tilted with respect to the incidence direction.

Accordingly, in the B reflection cholesteric liquid crystal layer 34B, the reflection angle of reflected light of incident light can be adjusted by adjusting the single period $\Lambda_B$.

The single period $\Lambda_B$ of the liquid crystal alignment pattern is not particularly limited. From the viewpoint that reflected light can be reflected in a state where it is largely tilted with respect to the incidence direction, the single period $\Lambda_B$ of the liquid crystal alignment pattern is preferably 1.6 μm or less, more preferably 1.0 μm or less, and still more preferably 0.6 μm or less.

The single period $\Lambda_B$ corresponds to the single period $\Lambda_1$ in the present invention.

In addition, in the B reflection cholesteric liquid crystal layer 34B shown in FIG. 2, the liquid crystal compound 40 is tilted with respect to the main surface, and the tilt direction substantially matches with the bright lines B and the dark lines D of the cholesteric liquid crystalline phase. Therefore, in the B reflection cholesteric liquid crystal layer 34B, the action of the liquid crystal compound 40 on light reflection (diffraction) increases, the diffraction efficiency can be improved. As a result, in the liquid optical laminate according to the embodiment of the present invention, for example, the amount of reflected light with respect to incidence light can be further improved as compared to that in the related art.

In the example shown in FIG. 2, the tilt of the liquid crystal compound 40 and the tilt of the bright lines B and the dark lines D of the cholesteric liquid crystalline phase substantially match with each other, but the present invention is not limited thereto. For example, the liquid crystal compound 40 may not be tilted, that is, may be parallel to the main surface of the cholesteric liquid crystal layer.

<G Reflection Cholesteric Liquid Crystal Layer>

The G reflection cholesteric liquid crystal layer 34G reflects circularly polarized light in a green wavelength range.

Figure 6:
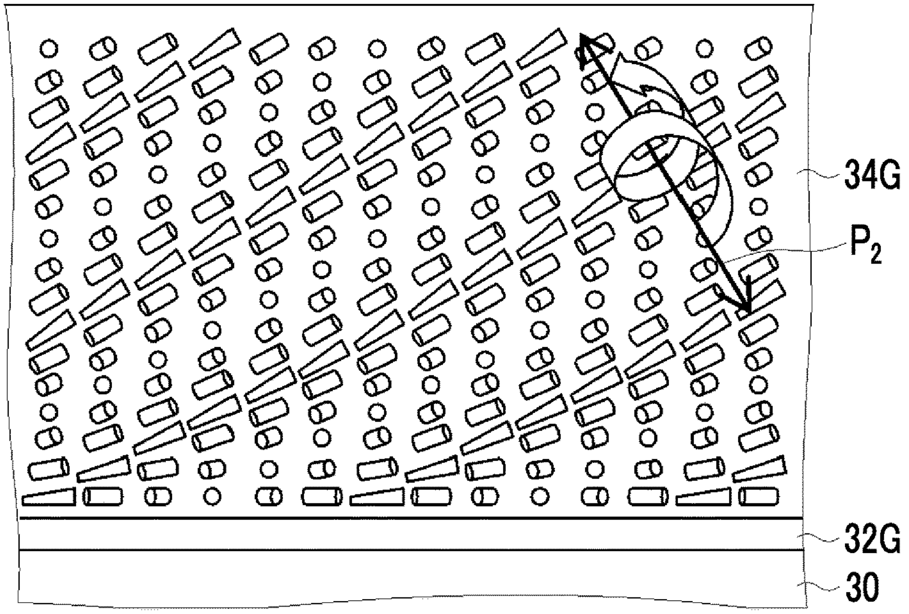
FIG. 6 is a diagram conceptually showing an example of a G reflection cholesteric liquid crystal layer forming the optical laminate according to the present invention.
Figure 7:
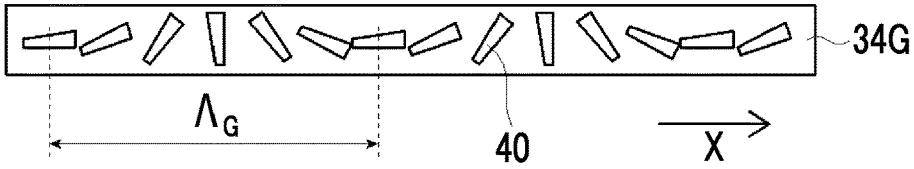
FIG. 7 is a plan view showing the G reflection cholesteric liquid crystal layer of the optical laminate shown in FIG. 6.

FIG. 6 conceptually shows a laminate including the G reflection cholesteric liquid crystal layer 34G. In addition, FIG. 7 conceptually shows a plan view of the G reflection cholesteric liquid crystal layer 34G. FIG. 7 only shows the liquid crystal compounds 40 arranged in the arrow X direction, and the liquid crystal compounds 40 having the same direction of the optical axes 40A are arranged in the Y direction as in the example shown in FIG. 4.

The laminate shown in FIG. 6 includes the support 30, an alignment film 32G, and the G reflection cholesteric liquid crystal layer 34G. The support 30 has the same configuration as the above-described support 30.

The alignment film 32G is an alignment film for aligning the liquid crystal compound 40 to a predetermined liquid crystal alignment pattern during the formation of the G reflection cholesteric liquid crystal layer 34G. As described below, in the G reflection cholesteric liquid crystal layer 34G, a rotation direction of the direction of the optical axis of the liquid crystal alignment pattern is opposite to that of the B reflection cholesteric liquid crystal layer 34B, and a length $\Lambda_G$ of the single period of the liquid crystal alignment pattern is longer than a length $\Lambda_B$ of the single period in the B reflection cholesteric liquid crystal layer 34B. Accordingly, the alignment film 32G has an alignment pattern such that the liquid crystal compound 40 in the G reflection cholesteric liquid crystal layer 34G can form the liquid crystal alignment pattern. That is, in a case where the alignment film 32G is exposed, for example, using an exposure device shown in FIG. 3, a desired alignment pattern can be obtained by adjusting the directions of the optical axes of the λ/4 plates 72A and 72B and the intersecting angle α between the two beams MA and MB.

Since the alignment film 32G basically has the same configuration as the alignment film 32B except that it has a different alignment pattern, the description thereof will not be repeated.

In addition, the length $\Lambda_G$ of the single period corresponds to the length $\Lambda_2$ of the single period in the present invention.

In the G reflection cholesteric liquid crystal layer 34G, the cholesteric liquid crystalline phase is immobilized as in the B reflection cholesteric liquid crystal layer 34B. That is, the G reflection cholesteric liquid crystal layer 34G is a layer formed of the liquid crystal compound 40 (liquid crystal material) having a cholesteric structure. The G reflection cholesteric liquid crystal layer 34G reflects only left circularly polarized light $B_L$ in the green wavelength range and allows transmission of the other light.

As shown in FIGS. 6 and 7, as in the B reflection cholesteric liquid crystal layer 34B, the G reflection cholesteric liquid crystal layer 34G has a liquid crystal alignment pattern in which a direction of an optical axis derived from a liquid crystal compound changes while continuously rotating in at least one in-plane direction.

Here, as shown in FIG. 7, in the liquid crystal alignment pattern of the G reflection cholesteric liquid crystal layer 34G, the rotation direction of the optical axis 40A of the liquid crystal compound 40 that continuously rotates in the arrow X direction (predetermined one in-plane direction) is opposite to that of the B reflection cholesteric liquid crystal layer. In the example shown in the drawing, the optical axis in the liquid crystal alignment pattern of the B reflection cholesteric liquid crystal layer 34B continuously rotates clockwise in the arrow X direction (refer to FIG. 4), and the optical axis in the liquid crystal alignment pattern of the G reflection cholesteric liquid crystal layer 34G continuously rotates counterclockwise (refer to FIG. 7).

In addition, in the G reflection cholesteric liquid crystal layer 34G and the B reflection cholesteric liquid crystal layer 34B, turning directions of circularly polarized light to be reflected are opposite to each other. Accordingly, as shown in FIG. 6, in the cholesteric liquid crystalline phase of the G reflection cholesteric liquid crystal layer 34G, the turning direction of the liquid crystal compound 40 that is helically turned and laminated is opposite to that of the B reflection cholesteric liquid crystal layer 34B. In the example shown in the drawing, the helical turning direction of the cholesteric liquid crystalline phase in the B reflection cholesteric liquid crystal layer 34B is a right rotating direction, and the helical turning direction of the cholesteric liquid crystalline phase in the G reflection cholesteric liquid crystal layer 34G is a right rotating direction. Accordingly, the G reflection cholesteric liquid crystal layer 34G reflects left circularly polarized light.

In the G reflection cholesteric liquid crystal layer 34G and the B reflection cholesteric liquid crystal layer 34B, the rotation directions of the liquid crystal alignment pattern are opposite to each other, and the helical turning directions of the cholesteric liquid crystalline phase are opposite to each other.

As a result, the G reflection cholesteric liquid crystal layer 34G reflects green left circularly polarized light $G_L$ in the same direction (upper left direction in the drawing) as the direction in which the B reflection cholesteric liquid crystal layer 34B reflects blue right circularly polarized light $B_R$.

The G reflection cholesteric liquid crystal layer 34G reflects circularly polarized light in a green wavelength range, and the B reflection cholesteric liquid crystal layer 34B reflects circularly polarized light in a blue wavelength range. As described above, the selective reflection center wavelength k in the cholesteric liquid crystalline phase depends on the length of one helical pitch P. Accordingly, in a case where a helical pitch of the G reflection cholesteric liquid crystal layer 34G is represented by $P_2$ and a helical pitch of the B reflection cholesteric liquid crystal layer 34B is represented by $P_1$, $P_1<P_2$.

In addition, the helical pitch $P_2$ of the G reflection cholesteric liquid crystal layer 34G and the helical pitch $P_1$ of the B reflection cholesteric liquid crystal layer 34B have the relationship of $P_1<P_2$. Accordingly, in order that a reflection angle of the green left circularly polarized light $G_L$ reflected from the G reflection cholesteric liquid crystal layer 34G and a reflection angle of the blue right circularly polarized light $B_R$ reflected from the B reflection cholesteric liquid crystal layer 34B substantially match with each other, the length $\Lambda_G$ of the single period of the liquid crystal alignment pattern of the G reflection cholesteric liquid crystal layer 34G and the length $\Lambda_B$ of the single period of the liquid crystal alignment pattern of the B reflection cholesteric liquid crystal layer 34B have a relationship of $\Lambda_B<\Lambda_G$.

The optical laminate 14 includes the B reflection cholesteric liquid crystal layer 34B and the G reflection cholesteric liquid crystal layer 34G described above. An action of the optical laminate according to the embodiment of the present invention and an action of the image display apparatus 10 (FIG. 1) including the optical laminate will be described.

First, an example in the related art will be described using FIG. 8.

Figure 8:
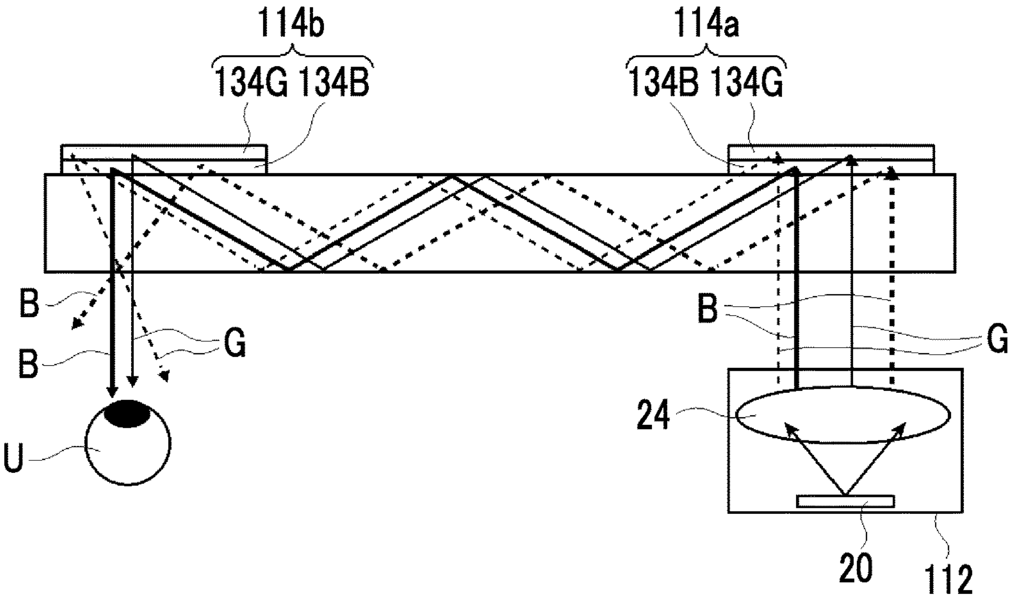
FIG. 8 is a diagram conceptually showing an example of an image display apparatus including an optical laminate in the related art.

FIG. 8 is a diagram conceptually showing an image display apparatus 100 including optical laminates 114*a* and 114*b* in the related art. The image display apparatus 100 shown in FIG. 8 includes a display element 12, optical laminates 114*a* and 114*b*, and a light guide plate 16. The optical laminates 114*a* and 114*b* are bonded to be spaced from end parts on the same surface of the light guide plate 16 in a longitudinal direction, the optical laminate 114*a* is on the display element 12 side, and the optical laminate 114*b* is on an image display side.

The optical laminate 114 includes a B reflection cholesteric liquid crystal layer 134B and a G reflection cholesteric liquid crystal layer 134G.

Both of the B reflection cholesteric liquid crystal layer 134B and the G reflection cholesteric liquid crystal layer 134G are cholesteric liquid crystal layers having the liquid crystal alignment pattern in which a direction of an optical axis derived from a liquid crystal compound changes while continuously rotating in at least one in-plane direction. Accordingly, incident light is reflected in a direction different from that of specular reflection.

Here, both of the B reflection cholesteric liquid crystal layer 134B and the G reflection cholesteric liquid crystal layer 134G reflect circularly polarized light (for example, right circularly polarized light in the same turning direction. Accordingly, the rotation directions of the direction of the optical axis of the liquid crystal compound in the liquid crystal alignment pattern are the same.

In addition, the display element 112 emits the blue right circularly polarized light $B_R$ and the green right circularly polarized light $G_R$ to display a two-color image.

In the image display apparatus 100 including the optical laminates 114*a* and 114*b* at both the end parts of the light guide plate 16, the blue right circularly polarized light $B_R$ emitted from the display element 12 transmits through the light guide plate 16, is incident into the optical laminate 114*a*, is reflected from the optical laminate 114*a* in a state where it is tilted at a predetermined angle, and is incident into the light guide plate 16 again at an angle with respect to the normal direction of the main surface of the light guide plate 16. The blue right circularly polarized light $B_R$ incident into the light guide plate 16 at an angle with respect to the normal direction of the main surface of the light guide plate 16 is repeatedly reflected in the light guide plate 16, is guided to the optical laminate 114*b* side, is incident into the optical laminate 114*b*, and is reflected in a direction substantially perpendicular to the main surface of the light guide plate. As a result, the blue right circularly polarized light $B_R$ is emitted from the light guide plate 16 and is emitted to an observation position of the user U.

Likewise, the green right circularly polarized light $G_R$ emitted from the display element 12 transmits through the light guide plate 16, is incident into the optical laminate 114*a*, is reflected from the optical laminate 114*a* in a state where it is tilted at a predetermined angle, and is incident into the light guide plate 16 again at an angle with respect to the normal direction of the main surface of the light guide plate 16. The green right circularly polarized light $G_R$ incident into the light guide plate 16 at an angle with respect to the normal direction of the main surface of the light guide plate 16 is repeatedly reflected in the light guide plate 16, is guided to the optical laminate 114*b* side, is incident into the optical laminate 114*b*, and is reflected in a direction substantially perpendicular to the main surface of the light guide plate. As a result, the green right circularly polarized light $G_R$ is emitted from the light guide plate 16 and is emitted to an observation position of the user U.

This way, the blue right circularly polarized light $B_R$ and the green right circularly polarized light $G_R$ are guided in the light guide plate 16 and emitted at the observation position by the user U such that a two-color image is displayed.

Here, in the image display apparatus 100 in the related art, as indicated by a broken line in FIG. 8, a part of the blue right circularly polarized light $B_R$ is reflected from the G reflection cholesteric liquid crystal layer 134G (thick broken line in FIG. 8), and a part of the green right circularly polarized light $G_R$ is reflected from the B reflection cholesteric liquid crystal layer 134B (thin broken line in FIG. 8). In a case where the blue right circularly polarized light $B_R$ is reflected from the G reflection cholesteric liquid crystal layer 134G, the reflection (diffraction) angle is different from that of the green right circularly polarized light $G_R$. Likewise, in a case where the green right circularly polarized light $G_R$ is reflected from the B reflection cholesteric liquid crystal layer 134B, the reflection (diffraction) angle is different from that of the blue right circularly polarized light $B_R$. Therefore, the blue right circularly polarized light $B_R$ reflected from the B reflection cholesteric liquid crystal layer 134B and the blue right circularly polarized light $B_R$ reflected from the G reflection cholesteric liquid crystal layer 134G are different in traveling direction. Likewise, the green right circularly polarized light $G_R$ reflected from the G reflection cholesteric liquid crystal layer 134G and the green right circularly polarized light $G_R$ reflected from the B reflection cholesteric liquid crystal layer 134B are different in traveling direction. This way, crosstalk occurs, which causes a problem in that double images are visually recognized by the user U. In the description using FIG. 8, crosstalk occurs in the optical laminate 114*b* on the emission side. However, crosstalk also occurs in the optical laminate 114*a* on the incidence side, which causes the occurrence of double images.

The optical laminate 14 according to the embodiment of the present invention includes the B reflection cholesteric liquid crystal layer 34B and the G reflection cholesteric liquid crystal layer 34G described above.

Figure 10:
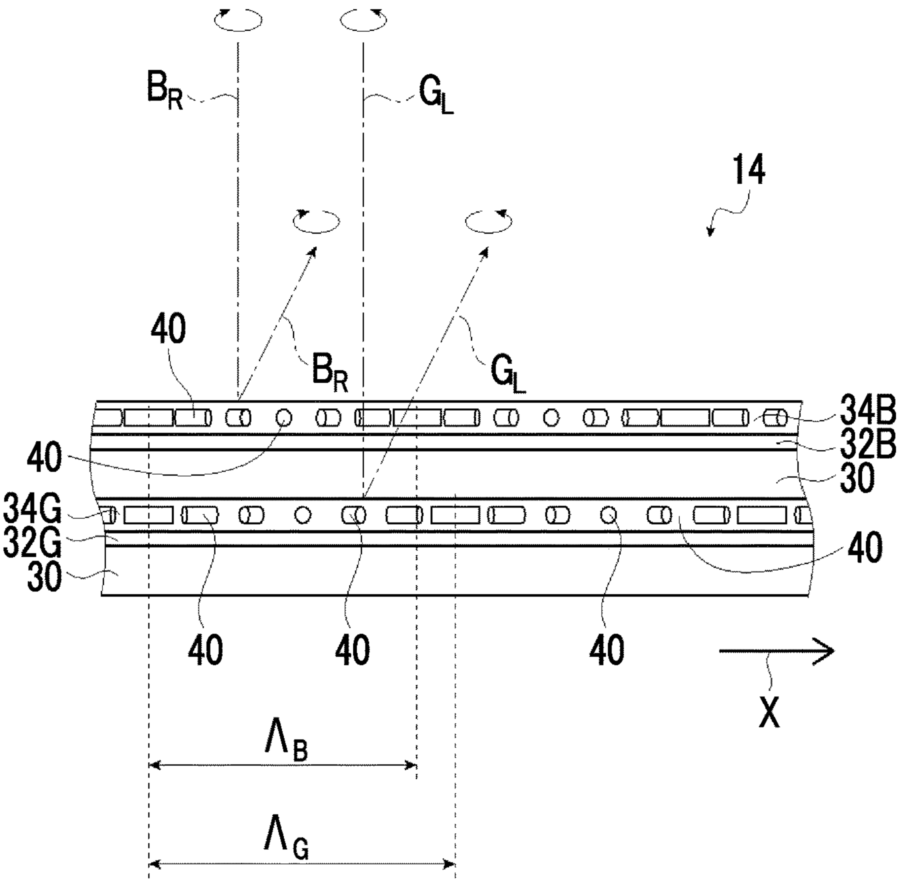
FIG. 10 is a conceptual diagram showing an action of the optical laminate shown in FIG. 1.

FIG. 10 is a conceptual diagram showing the optical laminate 14 including the B reflection cholesteric liquid crystal layer 34B and the G reflection cholesteric liquid crystal layer 34G.

In FIG. 10, in order to simplify the drawing and to clarify the configuration of the optical laminate 14, only the liquid crystal compound 40 (liquid crystal compound molecules) on the surface of the alignment film is conceptually shown as the B reflection cholesteric liquid crystal layer 34B and the G reflection cholesteric liquid crystal layer 34G. However, as conceptually shown in FIGS. 2 and 6, the B reflection cholesteric liquid crystal layer 34B and the G reflection cholesteric liquid crystal layer 34G have a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360) and laminated is set as one helical pitch, and plural pitches of the helically turned liquid crystal compound 40 are laminated.

As described above, in the B reflection cholesteric liquid crystal layer 34B and the G reflection cholesteric liquid crystal layer 34G, turning directions of circularly polarized light to be reflected are opposite to each other. In addition, in the B reflection cholesteric liquid crystal layer 34B and the G reflection cholesteric liquid crystal layer 34G, the liquid crystal alignment patterns are formed such that light components are reflected at the same angle in the same direction.

As a result, the blue right circularly polarized light $B_R$ is reflected from the B reflection cholesteric liquid crystal layer 34B, and the green left circularly polarized light $G_L$ is reflected from the G reflection cholesteric liquid crystal layer 34G. In addition, as shown in FIG. 10, the blue right circularly polarized light $B_R$ and the green left circularly polarized light $G_L$ are reflected at substantially the same angle in the same direction.

Here, a part of the blue right circularly polarized light $B_R$ transmits through the B reflection cholesteric liquid crystal layer 34B and is incident into the G reflection cholesteric liquid crystal layer 34G. Since the G reflection cholesteric liquid crystal layer 34G reflects left circularly polarized light, the blue right circularly polarized light $B_R$ as right circularly polarized light transmits through the G reflection cholesteric liquid crystal layer 34G without being reflected. In addition, the green left circularly polarized light $G_L$ is incident into the B reflection cholesteric liquid crystal layer 34B. However, since the B reflection cholesteric liquid crystal layer 34B reflects right circularly polarized light, the green left circularly polarized light $G_L$ as left circularly polarized light transmits through the B reflection cholesteric liquid crystal layer 34B without being reflected.

As a result, each of the blue right circularly polarized light $B_R$ and the green left circularly polarized light $G_L$ is reflected at a predetermined angle, a component that is reflected at another angle can be suppressed, and the occurrence of crosstalk can be suppressed.

In addition, in the optical laminate of the image display apparatus 10 including the optical laminate 14, the blue right circularly polarized light $B_R$ is not reflected from the G reflection cholesteric liquid crystal layer 34G, the green left circularly polarized light $G_L$ is not reflected from the B reflection cholesteric liquid crystal layer 34B, and the occurrence of crosstalk can be suppressed. Therefore, the occurrence of double images can be suppressed.

In the example shown in FIG. 10, the optical laminate is configured to include: the B reflection cholesteric liquid crystal layer 34B that reflects blue circularly polarized light; and the G reflection cholesteric liquid crystal layer 34G that reflects green circularly polarized light. However, the present invention is not limited to this configuration. The optical laminate may be configured to include the first cholesteric liquid crystal layer and the second cholesteric liquid crystal layer that reflect circularly polarized light components in different wavelength ranges. For example, the optical laminate may include: a cholesteric liquid crystal layer that reflects red circularly polarized light; and a cholesteric liquid crystal layer that reflects green circularly polarized light.

In addition, in the example shown in FIG. 10, the B reflection cholesteric liquid crystal layer 34B (first cholesteric liquid crystal layer) reflects right circularly polarized light, and the G reflection cholesteric liquid crystal layer 34G (second cholesteric liquid crystal layer) reflects left circularly polarized light. However, the B reflection cholesteric liquid crystal layer 34B (first cholesteric liquid crystal layer) may reflect left circularly polarized light, and the G reflection cholesteric liquid crystal layer 34G (second cholesteric liquid crystal layer) may reflect right circularly polarized light.

In addition, in the liquid crystal alignment pattern of the B reflection cholesteric liquid crystal layer 34B (first cholesteric liquid crystal layer) and the liquid crystal alignment pattern of the G reflection cholesteric liquid crystal layer 34G (second cholesteric liquid crystal layer), it is preferable that the one in-plane directions (arrow X directions) in which the optical axis derived from the liquid crystal compound changes while continuously rotating only in one in-plane direction are the same.

As a result, the directions of light to be reflected can be made to be the same.

<R Reflection Cholesteric Liquid Crystal Layer>

Here, it is preferable that the optical laminate according to the embodiment of the present invention further comprises:

a third cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction, in which in the first and third cholesteric liquid crystal layers and the second cholesteric liquid crystal layer, turning directions of circularly polarized light to be reflected are opposite to each other, helical pitches as lengths in a thickness direction over which the liquid crystal compound that is helically turned and laminated in the cholesteric liquid crystalline phase turns by 360° are different from each other, rotation directions of the direction of the optical axis derived from the liquid crystal compound that continuously rotates in at least one in-plane direction in the liquid crystal alignment pattern are opposite to each other, in a case where a helical pitch of the third cholesteric liquid crystal layer is represented by $P_3$, $P_1<P_2<P_3$, and in a case where a length of the single period of the third cholesteric liquid crystal layer is represented by $\Lambda_3$, $\Lambda_1<\Lambda_2<\Lambda_3$.

Figure 9:
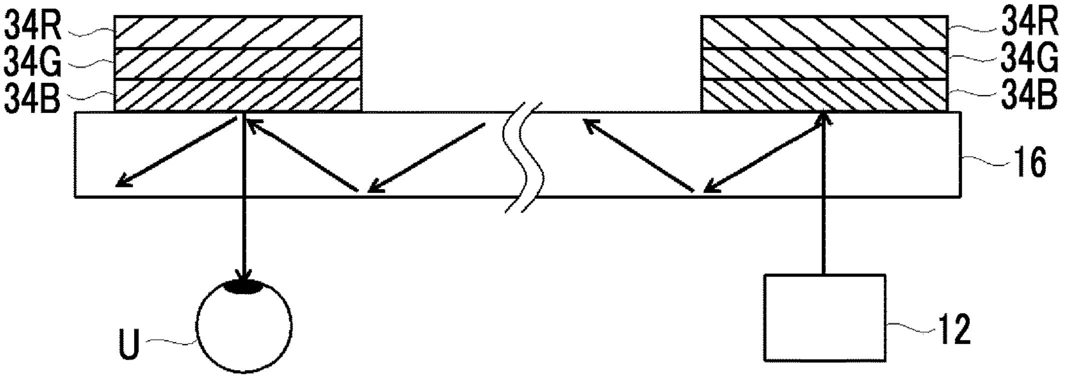
FIG. 9 is a diagram conceptually showing an example of the image display apparatus including the optical laminate according to the present invention.
Figure 11:
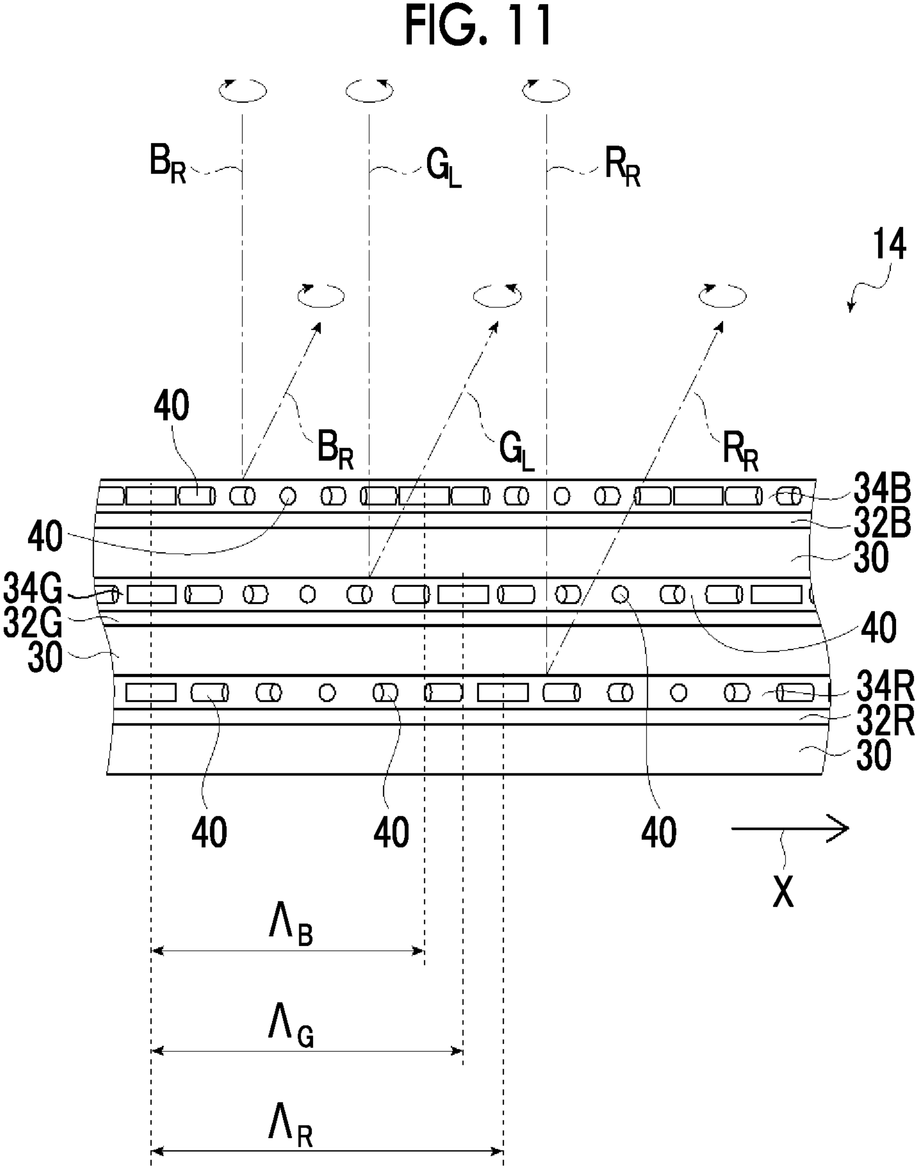
FIG. 11 is a conceptual diagram showing another action of the optical laminate.

FIG. 11 is a conceptual diagram showing an example of an optical laminate including the third cholesteric liquid crystal layer. FIG. 9 conceptually shows an example of an image display apparatus including a light guide element including the optical laminate.

In addition to the optical laminate shown in FIG. 10, the optical laminate 14 shown in FIG. 11 further includes the support 30, an alignment film 32R, and an R reflection cholesteric liquid crystal layer 34R. The R reflection cholesteric liquid crystal layer 34R corresponds to the third cholesteric liquid crystal layer according to the present invention.

The alignment film 32R is an alignment film for aligning the liquid crystal compound 40 to a predetermined liquid crystal alignment pattern described below during the formation of the R reflection cholesteric liquid crystal layer 34R. Since the alignment film 32R basically has the same configuration as the alignment film 32B except that it has a different alignment pattern, the description thereof will not be repeated.

In the R reflection cholesteric liquid crystal layer 34R, the cholesteric liquid crystalline phase is immobilized as in the B reflection cholesteric liquid crystal layer 34B. That is, the R reflection cholesteric liquid crystal layer 34R is a layer formed of the liquid crystal compound 40 (liquid crystal material) having a cholesteric structure. The R reflection cholesteric liquid crystal layer 34R reflects only right circularly polarized light $R_R$ in a red wavelength range and allows transmission of the other light.

As in the B reflection cholesteric liquid crystal layer 34B, the R reflection cholesteric liquid crystal layer 34R has a liquid crystal alignment pattern in which a direction of an optical axis derived from a liquid crystal compound changes while continuously rotating in at least one in-plane direction.

Here, in the R reflection cholesteric liquid crystal layer 34R, the rotation direction of the optical axis 40A of the liquid crystal compound 40 in the liquid crystal alignment pattern is the same as that of the B reflection cholesteric liquid crystal layer 34B and is opposite to that of the G reflection cholesteric liquid crystal layer 34G.

In addition, in the R reflection cholesteric liquid crystal layer 34R, the turning direction of circularly polarized light to be reflected is the same as that of the B reflection cholesteric liquid crystal layer 34B and is opposite to that of the G reflection cholesteric liquid crystal layer 34G. Accordingly, the R reflection cholesteric liquid crystal layer 34R reflects right circularly polarized light.

Accordingly, in the R reflection cholesteric liquid crystal layer 34R, the liquid crystal alignment pattern is formed such that light components are reflected at the same angle in the same direction as those in the B reflection cholesteric liquid crystal layer 34B and the G reflection cholesteric liquid crystal layer 34G.

In a case where a helical pitch of the R reflection cholesteric liquid crystal layer 34R is represented by $P_3$, $P_1<P_2<P_3$.

In addition, a length $\Lambda_R$ of the single period of the liquid crystal alignment pattern in the R reflection cholesteric liquid crystal layer 34R satisfies a relationship of $\Lambda_B<\Lambda_G<\Lambda_R$.

In this configuration, the red right circularly polarized light $R_R$ is incident into the G reflection cholesteric liquid crystal layer 34G. Since the G reflection cholesteric liquid crystal layer 34G reflects left circularly polarized light, the red right circularly polarized light $R_R$ as right circularly polarized light transmits through the G reflection cholesteric liquid crystal layer 34G without being reflected. In addition, a part of the green left circularly polarized light $G_L$ transmits through the G reflection cholesteric liquid crystal layer 34G and is incident into the R reflection cholesteric liquid crystal layer 34R. However, since the R reflection cholesteric liquid crystal layer 34R reflects right circularly polarized light, the green left circularly polarized light $G_L$ as left circularly polarized light transmits through the R reflection cholesteric liquid crystal layer 34R without being reflected.

In addition, the red right circularly polarized light $R_R$ is incident into the B reflection cholesteric liquid crystal layer 34B, Since the wavelength of the red right circularly polarized light $R_R$ is distant from the selective reflection center wavelength of the B reflection cholesteric liquid crystal layer 34B, the red right circularly polarized light $R_R$ is not likely to be reflected from the B reflection cholesteric liquid crystal layer 34B. Likewise, a part of the blue right circularly polarized light $B_R$ is incident into the R reflection cholesteric liquid crystal layer 34R. Since the wavelength of the blue right circularly polarized light $B_R$ is distant from the selective reflection center wavelength of the R reflection cholesteric liquid crystal layer 34R, the blue right circularly polarized light $B_R$ is reflected from the R reflection cholesteric liquid crystal layer 34R.

The relationship between the blue right circularly polarized light $B_R$ and the G reflection cholesteric liquid crystal layer 34G and the relationship between the green left circularly polarized light $G_L$ and the B reflection cholesteric liquid crystal layer 34B are the same as those of FIG. 10.

As a result, each of the blue right circularly polarized light $B_R$, the green left circularly polarized light $G_L$, and the red right circularly polarized light $R_R$ is reflected at a predetermined angle, a component that is reflected at another angle can be suppressed, and the occurrence of crosstalk can be suppressed.

In addition, in the optical laminate of the image display apparatus including the optical laminate shown in FIG. 11, the occurrence of crosstalk can be suppressed, and the occurrence of double images can be suppressed. In this case, in the image display apparatus, the display element displays a RGB color image, blue light is emitted as right circularly polarized light, green light is emitted as left circularly polarized light, and red light is emitted as right circularly polarized light.

In the example shown in FIG. 11, the optical laminate is configured to include: the B reflection cholesteric liquid crystal layer 34B that reflects blue circularly polarized light; the G reflection cholesteric liquid crystal layer 34G that reflects green circularly polarized light, and the R reflection cholesteric liquid crystal layer 34R that reflects red circularly polarized light. However, the present invention is not limited to this example. The optical laminate may be configured to include a first cholesteric liquid crystal layer, a second cholesteric liquid crystal layer, and a third cholesteric liquid crystal layer that reflect circularly polarized light components in different wavelength ranges.

In addition, in the example shown in FIG. 11, the B reflection cholesteric liquid crystal layer 34B (first cholesteric liquid crystal layer) reflects right circularly polarized light, the G reflection cholesteric liquid crystal layer 34G (second cholesteric liquid crystal layer) reflects left circularly polarized light, and the R reflection cholesteric liquid crystal layer 34R (third cholesteric liquid crystal layer) reflects right circularly polarized light. However, the B reflection cholesteric liquid crystal layer 34B (first cholesteric liquid crystal layer) may reflect left circularly polarized light, the G reflection cholesteric liquid crystal layer 34G (second cholesteric liquid crystal layer) may reflect right circularly polarized light, and the R reflection cholesteric liquid crystal layer 34R (third cholesteric liquid crystal layer) may reflect left circularly polarized light.

In addition, in the liquid crystal alignment pattern of the B reflection cholesteric liquid crystal layer 34B (first cholesteric liquid crystal layer), the liquid crystal alignment pattern of the G reflection cholesteric liquid crystal layer 34G (second cholesteric liquid crystal layer), and the liquid crystal alignment pattern of the R reflection cholesteric liquid crystal layer 34R (third cholesteric liquid crystal layer), it is preferable that the one in-plane directions (arrow X directions) in which the optical axis derived from the liquid crystal compound changes while continuously rotating only in one in-plane direction are the same.

As a result, the directions of light to be reflected can be made to be the same.

In addition, the lamination order of the B reflection cholesteric liquid crystal layer 34B (first cholesteric liquid crystal layer), the G reflection cholesteric liquid crystal layer 34G (second cholesteric liquid crystal layer), and the R reflection cholesteric liquid crystal layer 34R (third cholesteric liquid crystal layer) is not limited to the example shown in FIG. 11, and the lamination order of the respective layers is not particularly limited.

<<Method of Forming Cholesteric Liquid Crystal Layer>>

A method of forming the cholesteric liquid crystal layer (the first cholesteric liquid crystal layer, the second cholesteric liquid crystal layer, and the third cholesteric liquid crystal layer) will be described.

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

A method of forming the cholesteric liquid crystal layer is not limited, and various well-known forming methods can be used.

In particular, in the method of forming the cholesteric liquid crystal layer described below, the cholesteric liquid crystal layer can be stably and suitably formed, which is preferable.

<<<Liquid Crystal Composition>>>

Examples of a material used for forming the cholesteric liquid crystal layer obtained by immobilizing a cholesteric liquid crystalline phase include a liquid crystal composition including a liquid crystal compound and a chiral agent. It is preferable that the liquid crystal compound is a polymerizable liquid crystal compound.

In addition, the liquid crystal composition used for forming the cholesteric liquid crystal layer may further include a surfactant or the like.

——Polymerizable Liquid Crystal Compound——

The polymerizable liquid crystal compound may be a rod-like liquid crystal compound or a disk-like liquid crystal compound.

Examples of the rod-like polymerizable liquid crystal compound for forming the cholesteric liquid crystalline phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

——Surfactant——

The liquid crystal composition used for forming the cholesteric liquid crystal layer may include a surfactant.

It is preferable that the surfactant is a compound that can function as an alignment control agent contributing to the stable or rapid formation of a cholesteric liquid crystalline phase with planar alignment. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

(Alignment Control Agent)

In a case where the liquid crystal composition is applied to the alignment film, it is preferable that at least one additive (alignment control agent) for providing the region having a pretilt angle is added to at least one of an alignment film side or an air interface side. By adding the above-described additive to the composition, the region having a pretilt angle can be provided in the cholesteric liquid crystal layer.

In a case where the liquid crystal composition is applied to the alignment film, it is preferable that an air interface alignment agent may be added in addition to the liquid crystal compound in order to provide a pretilt angle to the air interface side. As a result, the region having a pretilt angle can be formed in at least one of upper and lower interfaces of the cholesteric liquid crystal layer. The air interface alignment agent includes: a fluoropolymer (X) including a constitutional unit represented by Formula (A) described below; and a fluoropolymer (Y) having a polar group without having the constitutional unit represented by Formula (A) described below. The air interface alignment agent is suitably used for forming the cholesteric liquid crystal layer.

It is preferable that the air interface alignment agent in the liquid crystal composition includes at least: a fluoropolymer (X) including a constitutional unit represented by Formula (A) described below; and a fluoropolymer (Y) having a polar group without having the constitutional unit represented by Formula (A) described below.

<Fluoropolymer (X)>

The fluoropolymer (X) includes a constitutional unit represented by Formula (A) described below.

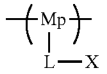

(A)

(In Formula (A), Mp represents a trivalent group forming a part of a polymer main chain, L represents a single bond or a divalent linking group, and X represents a substituted or unsubstituted fused ring functional group.)

In Formula (A), Mp represents a trivalent group forming a part of a polymer main chain.

Preferable examples of Mp include a substituted or unsubstituted long-chain or branched alkylene group having 2 to 20 carbon atoms (not including the number of carbon atoms in a substituent; hereinafter, the same can be applied to those in Mp) (for example, an ethylene group, a propylene group, a methylethylene group, a butylene group, or a hexylene group), a substituted or unsubstituted cyclic alkylene group having 3 to 10 carbon atoms (for example, a cyclopropylene group, a cyclobutylene group, or a cyclohexylene group), a substituted or unsubstituted vinylene group, a substituted or unsubstituted cyclic vinylene group, a substituted or unsubstituted phenylene group, a group having an oxygen atom (for example, a group having an ether group, an acetal group, an ester group, a carbonate group, or the like), a group having a nitrogen atom (for example, group having an amino group, an imino group, an amide group, a urethane group, a ureido group, an imide group, an imidazole group, an oxazole group, a pyrrole group, an anilide group, a maleinimide group, or the like), a group having a sulfur atom (for example, a group having a sulfide group, a sulfone group, a thiophene group, or the like), a group having a phosphorus atom (for example, a group having a phosphine group, a phosphate group, or the like), a group having a silicon atom (for example, a group having a siloxane group), a group obtained by linking two or more of the above-described groups, and a group obtained by substituting one hydrogen atom in each of the above-described groups with a -L-X group.

Among these, a substituted or unsubstituted ethylene group, a substituted or unsubstituted methylethylene group, a substituted or unsubstituted cyclohexylene group, or a substituted or unsubstituted vinylene group where one hydrogen atom is substituted with a -L-X group is preferable, a substituted or unsubstituted ethylene group, a substituted or unsubstituted methylethylene group, or a substituted or unsubstituted vinylene group where one hydrogen atom is substituted with a -L-X group is more preferable, and a substituted or unsubstituted ethylene group or a substituted or unsubstituted methylethylene group where one hydrogen atom is substituted with a -L-X group is still more preferable. Specifically, Mp-1 or Mp-2 described below is preferable.

Hereinafter, specific preferable examples of Mp will be shown, but Mp is not limited to these examples. In addition, a portion represented by * in Mp represents a portion linked to L.

(Mp-1)

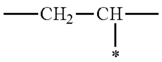

(Mp-2)

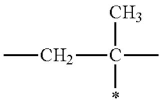

(Mp-3)

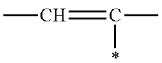

(Mp-4)

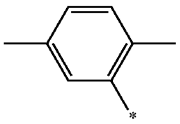

(Mp-5)

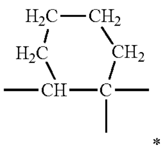

(Mp-6)

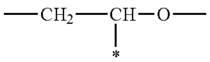

(Mp-7)

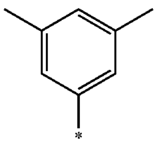

(Mp-8)

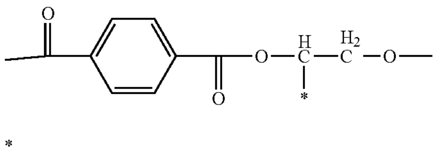

(Mp-9)

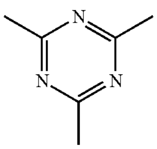

-continued (Mp-10)

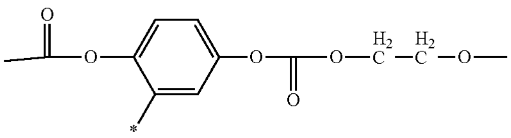

(Mp-11)

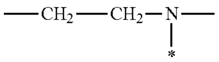

(Mp-12)

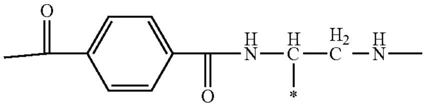

(Mp-13)

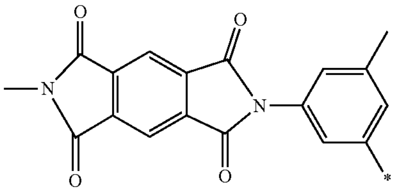

(Mp-14)

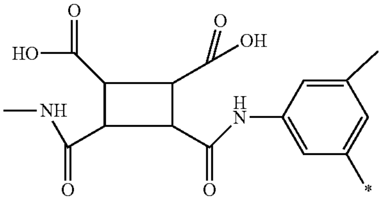

(Mp-15)

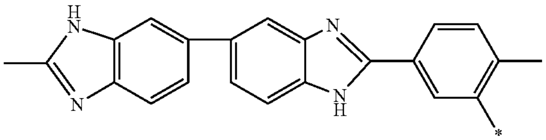

(Mp-16)

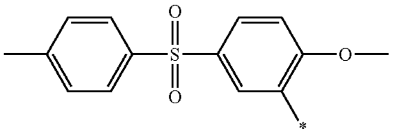

(Mp-17)

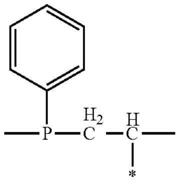

(Mp-18)

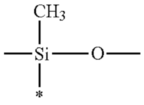

(Mp-19)

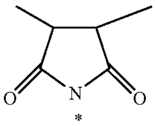

In a case where L (a single bond or a divalent linking group) in Formula (A) represents a divalent linking group, it is preferable that the divalent linking group is a divalent linking group represented by *-L1-L2- (* represents a linking site to a main chain) where L1 represents *—COO—, *—CONH—, *—OCO—, or *—NHCO— and L2 represents an alkylene group having 2 to 20 carbon atoms, a polyoxyalkylene group having 2 to 20 carbon atoms, or a divalent linking group including a combination thereof.

In particular, a linking group where L1 represents *—COO— and L2 represents a polyoxyalkylene group having 2 to 20 carbon atoms is preferable.

The number of rings in the substituted or unsubstituted fused ring functional group represented by X in Formula (A) is not limited and is preferably 2 to 5. The substituted or unsubstituted fused ring functional group may be a hydrocarbon aromatic fused ring consisting of only carbon atoms as atoms forming the ring, or may be an aromatic fused ring in which heterocycles including heteroatoms as ring-constituting atoms are fused.

In addition, for example, X represents a substituted or unsubstituted indenyl group having 5 to 30 carbon atoms, a substituted or unsubstituted naphthyl group having 6 to 30 carbon atoms, a substituted or unsubstituted fluorenyl group having 12 to 30 carbon atoms, an anthryl group, a pyrenyl group, a perylenyl group, or a phenanthrenyl group.

Among these, X represents preferably a substituted or unsubstituted indenyl group having 5 to 30 carbon atoms or a substituted or unsubstituted naphthyl group having 6 to 30 carbon atoms, more preferably a substituted or unsubstituted naphthyl group having 10 to 30 carbon atoms, and still more preferably a substituted or unsubstituted naphthyl group having 10 to 20 carbon atoms.

Hereinafter, preferable specific examples of the constitutional unit represented by Formula (A) will be shown, but the present invention is not limited thereto.

A-1

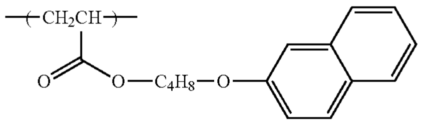

A-2

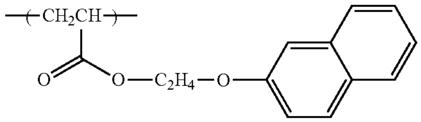

A-3

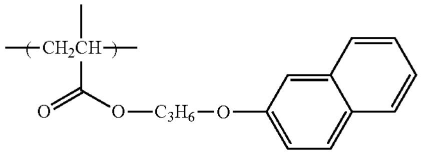

A-4

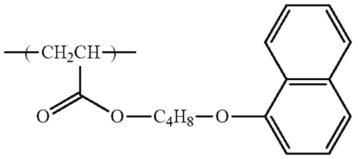

A-5

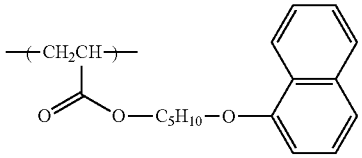

-continued

A-6

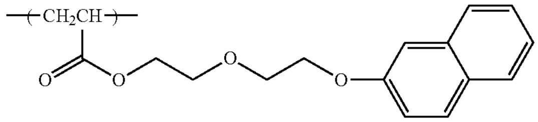

A-7

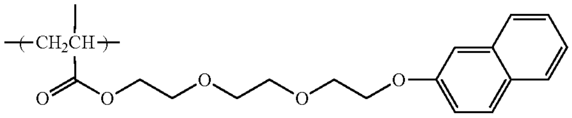

A-8

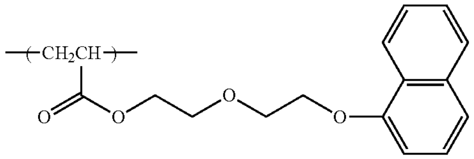

A-9

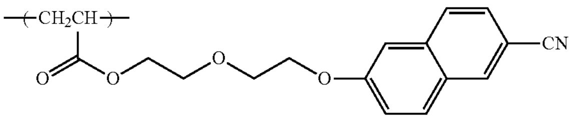

A-10

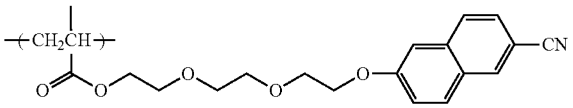

A-11

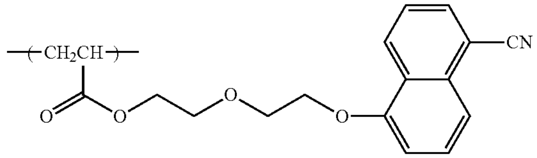

A-12

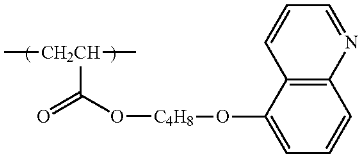

A-13

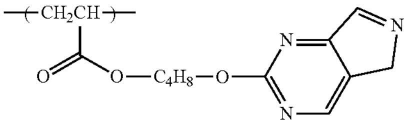

A-14

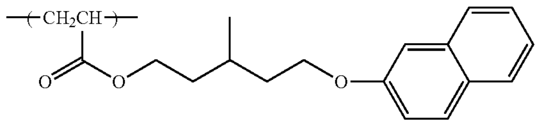

A-15

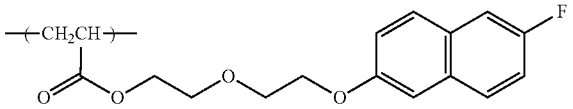

-continued
A-16
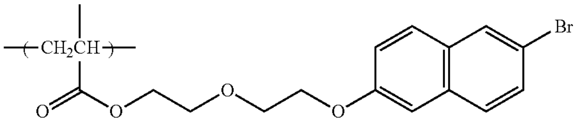
A-17
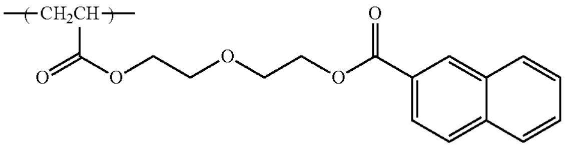
A-18
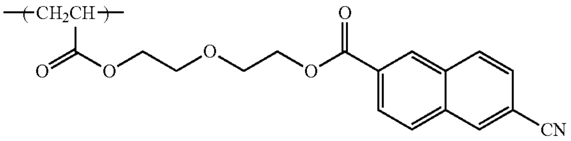
A-19
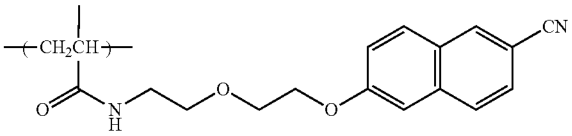
A-20
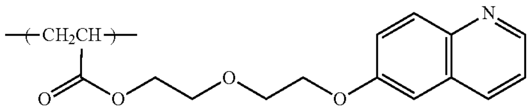
A-21
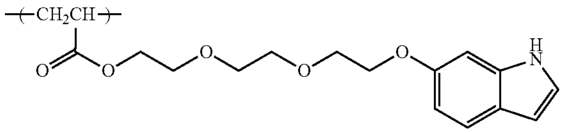
A-22
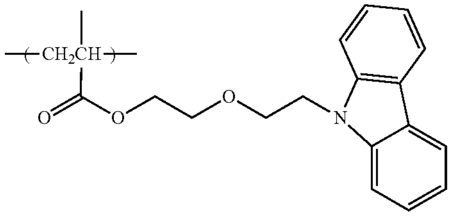
A-23
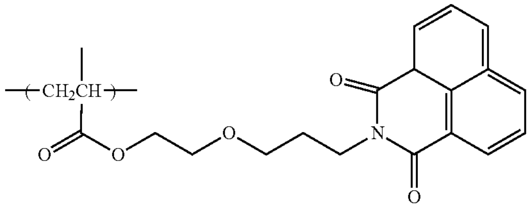
-continued
A-24
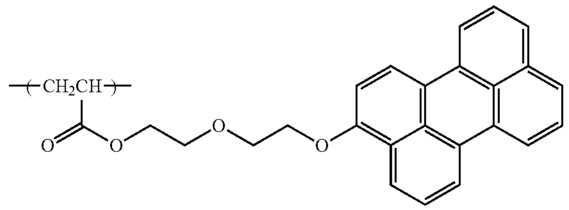
A-25
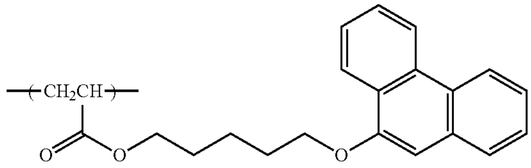
A-26
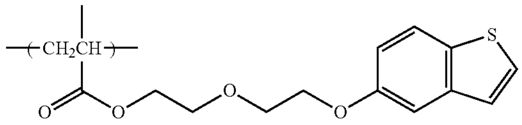
A-27
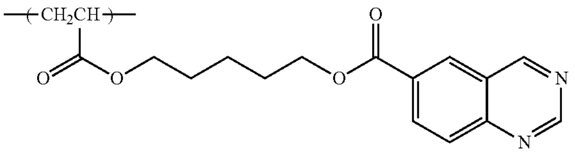
A-28
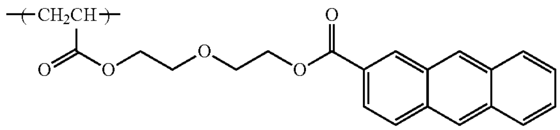
A-29
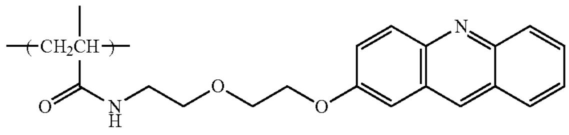
A-30
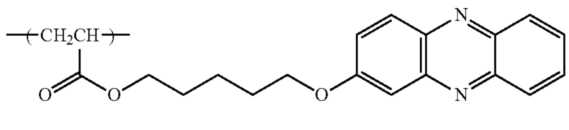
A-31
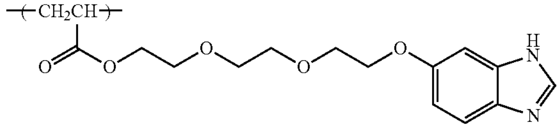

-continued

A-32

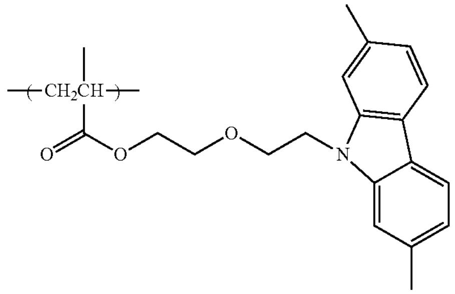

A-33

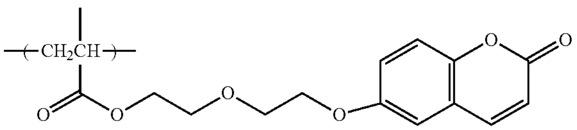

A-34

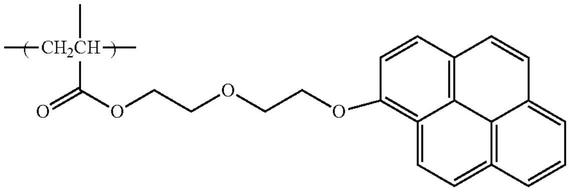

In addition, in addition to the constitutional unit represented by Formula (A), it is preferable that the fluoropolymer (X) includes, for example, a constitutional unit derived from a fluoroaliphatic group-containing monomer, and it is more preferable that the fluoropolymer (X) includes a constitutional unit represented by the following Formula (B).

(B)

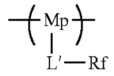

In Formula (B), Mp represents a trivalent group forming a part of a polymer main chain, L' represents a single bond or a divalent linking group, and Rf represents a substituent having at least one fluorine atom.

Mp in Formula (B) has the same definition and the same preferable range as Mp in Formula (A).

In a case where L' (a single bond or a divalent linking group) represents a divalent linking group, the divalent linking group is preferably —O—, —NRa11- (where Ra11 represents a hydrogen atom, an aliphatic hydrocarbon group having 1 to 10 carbon atoms, or an aryl group having 6 to 20 carbon atoms), —S—, —C(═O)—, —S(═O)$_2$—, a substituted or unsubstituted alkylene group having 1 to 20 carbon atoms, or and a divalent linking group selected from groups formed by two or more of the above-described groups being linked to each other.

Examples of the divalent linking group formed by two or more of the above-described groups being linked to each other include —C(═O)O—, —OC(═O)—, —OC(═O)O—, —C(═O)NH—, —NHC(═O)—, and —C(═O)O(CH$_2$)maO— (where ma represents an integer of 1 to 20).

Further, in a case where Mp in Formula (B) represents Mp-1 or Mp-2, L' represents —O—, —NRa11- (Ra11 represents preferably a hydrogen atom or an aliphatic hydrocarbon group having 1 to 10 carbon atoms), —S—, —C(═O)—, —S(═O)$_2$—, a substituted or unsubstituted alkylene group having 1 to 20 carbon atoms, or a divalent linking group selected from groups formed by two or more of the above-described groups being linked to each other, and more preferably —O—, —C(═O)O—, —C(═O)NH—, or a divalent linking group consisting of one or more of the above-described groups and an alkylene group.

Preferable examples of Rf include an aliphatic hydrocarbon group having 1 to 30 carbon atoms in which at least one fluorine atom is substituted (for example, a trifluoroethyl group, a perfluorohexylethyl group, a perfluorohexylpropyl group, a perfluorobutylethyl group, or a perfluorooctylethyl group). In addition, it is preferable that Rf has a $CF_3$ group or a $CF_2H$ group at a terminal, and it is more preferable Rf has a $CF_3$ group at a terminal.

It is more preferable that Rf represents an alkyl group having a $CF_3$ group at a terminal or an alkyl group having a $CF_2H$ group at a terminal. The alkyl group having a $CF_3$ group at a terminal is an alkyl group in which a part or all of hydrogen atoms in the alkyl group are substituted with fluorine atoms. An alkyl group having a $CF_3$ group at a terminal in which 50% or higher of hydrogen atoms are substituted with fluorine atoms is preferable, an alkyl group having a $CF_3$ group at a terminal in which 60% or higher of hydrogen atoms are substituted with fluorine atoms is more preferable, and an alkyl group having a $CF_3$ group at a terminal in which 70% or higher of hydrogen atoms are substituted with fluorine atoms is still more preferable. The remaining hydrogen atoms may be further substituted with a substituent described below as an example of a substituent group D.

The alkyl group having a $CF_2H$ group at a terminal is an alkyl group in which a part or all of hydrogen atoms in the alkyl group are substituted with fluorine atoms. An alkyl group having a $CF_2H$ group at a terminal in which 50% or higher of hydrogen atoms are substituted with fluorine atoms is preferable, an alkyl group having a $CF_2H$ group at a terminal in which 60% or higher of hydrogen atoms are substituted with fluorine atoms is more preferable, and an alkyl group having a $CF_2H$ group at a terminal in which 70% or higher of hydrogen atoms are substituted with fluorine atoms is still more preferable. The remaining hydrogen atoms may be further substituted with a substituent described below as an example of a substituent group D.

Substituent Group D

The substituent group D include an alkyl group (an alkyl group having preferably 1 to 20 carbon atoms (which are carbon atoms in the substituent; hereinafter, the same shall be applied to the substituent group D), more preferably 1 to 12 carbon atoms, and still more preferably 1 to 8 carbon atoms; for example, a methyl group, an ethyl group, an isopropyl group, a tert-butyl group, an n-octyl group, an n-decyl group, an n-hexadecyl group, a cyclopropyl group, a cyclopentyl group, or a cyclohexyl group), an alkenyl group (an alkenyl group having preferably 2 to 20 carbon atoms, more preferably 2 to 12 carbon atoms, and still more preferably 2 to 8 carbon atoms; for example, a vinyl group, a 2-butenyl group, or a 3-pentenyl group), an alkynyl group (an alkynyl group having preferably 2 to 20 carbon atoms, more preferably 2 to 12 carbon atoms, and still more preferably 2 to 8 carbon atoms; for example, a propargyl group or a 3-pentynyl group), a substituted or unsubstituted amino group (an amino group having preferably 0 to 20 carbon atoms, more preferably 0 to 10 carbon atoms, still more preferably 0 to 6 carbon atoms; for example, a unsubstituted amino group, a methylamino group, a dimethylamino group, or a diethylamino group), an alkoxy group (an alkoxy group having preferably 1 to 20 carbon atoms, more preferably 1 to 12 carbon atoms, and still more preferably 1 to 8 carbon atoms; for example, a methoxy group, an ethoxy group, or a butoxy group), an acyl group (an acyl group having preferably 1 to 20 carbon atoms, more preferably 1 to 16 carbon atoms, and still more preferably 1 to 12 carbon atoms; for example, an acetyl group, a formyl group, or a pivaloyl group), an alkoxycarbonyl groups (an alkoxycarbonyl group having preferably 2 to 20 carbon atoms, more preferably 2 to 16 carbon atoms, and still more preferably 2 to 12 carbon atoms; for example, a methoxycarbonyl group or an ethoxycarbonyl group), an acyloxy group (an acyloxy group having preferably 2 to 20 carbon atoms, more preferably 2 to 16 carbon atoms, and still more preferably 2 to 10 carbon atoms; for example, an acetoxy group), an acylamino group (an acylamino group having preferably 2 to 20 carbon atoms, more preferably 2 to 16 carbon atoms, and still more preferably 2 to 10 carbon atoms; for example, an acetylamino group), an alkoxycarbonylamino group (an alkoxycarbonylamino group having preferably 2 to 20 carbon atoms, more preferably 2 to 16 carbon atoms, and still more preferably 2 to 12 carbon atoms; for example, a methoxycarbonylamino group), a sulfonylamino group (a sulfonylamino group having preferably 1 to 20 carbon atoms, more preferably 1 to 16 carbon atoms, and still more preferably 1 to 12 carbon atoms; for example, a methanesulfonylamino group or an ethanesulfonylamino group), a sulfamoyl group (a sulfamoyl group having preferably 0 to 20 carbon atoms, more preferably 0 to 16 carbon atoms, and still more preferably 0 to 12 carbon atoms; for example, a sulfamoyl group, a methylsulfamoyl group, or a dimethylsulfamoyl group), an alkylthio group (an alkylthio group having preferably 1 to 20 carbon atoms, more preferably from 1 to 16 carbon atoms, and still more preferably from 1 to 12 carbon atoms; for example, a methylthio group or an ethylthio group), a sulfonyl group (a sulfonyl group having preferably 1 to 20 carbon atoms, more preferably from 1 to 16 carbon atoms, and still more preferably from 1 to 12 carbon atoms; for example, a mesyl group or a tosyl group), a sulfinyl group (a sulfinyl group having preferably 1 to 20 carbon atoms, more preferably from 1 to 16 carbon atoms, and still more preferably from 1 to 12 carbon atoms; for example, a methanesulfinyl group or an ethanesulfinyl group), a ureido group (a ureido group having preferably 1 to 20 carbon atoms, more preferably 1 to 16 carbon atoms, and still more preferably 1 to 12 carbon atoms; for example, an unsubstituted ureido group or a methylureido group), a phosphoric amide group (a phosphoric amide group having preferably 1 to 20 carbon atoms, more preferably 1 to 16 carbon atoms, and still more preferably 1 to 12 carbon atoms; for example, a diethylphosphoric amide group), a hydroxy group, a mercapto group, a halogen atom (for example, a fluorine atom, a chlorine atom, a bromine atom, or an iodine atom), a cyano group, a sulfo group, a carboxyl group, a nitro group, a hydroxamic acid group, a sulfino group, a hydrazino group, an imino group, and a silyl group (a silyl group having preferably from 3 to 40 carbon atoms, more preferably from 3 to 30 carbon atoms, and still more preferably from 3 to 24 carbon atoms; for example, a trimethylsilyl group). The substituents may be further substituted with the substituents. In addition, in a case where two or more substituents are present, the substituents may be the same as or different from each other. In addition, if possible, the substituents may be bonded to each other to form a ring.

Examples of the alkyl group having a $CF_3$ group at a terminal or the alkyl group having a $CF_2H$ group at a terminal are as follows.

R1: n-$C_8F_{17}$—
R2: n-$C_6F_{13}$—
R3: n-$C_4F_9$—
R4: n-$C_8F_{17}$—$(CH_2)_2$—
R5: n-$C_6F_{13}$—$(CH_2)_3$—
R6: n-$C_4F_9$—$(CH_2)_2$—
R7: H—$(CF_2)_8$—
R8: H—$(CF_2)_6$—
R9: H—$(CF_2)_4$—
R10: H—$(CF_2)_8$—$(CH_2)_2$—
R11: H—$(CF_2)_6$—$(CH_2)_3$—
R12: H—$(CF_2)_4$—$(CH_2)_2$—
R13: n-$C_7F_{15}$—$(CH_2)_2$—
R14: n-$C_6F_{13}$—$(CH_2)_3$—
R15: n-$C_4F_9$—$(CH_2)_2$—

Hereinafter, specific examples of the constitutional unit derived from the fluoroaliphatic group-containing monomer will be shown, but the present invention is not limited thereto.

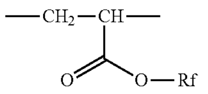

RF =

—$CH_2CH_2C_4F_9$ (B-1)

—$CH_2CH_2CH_2C_4F_9$ (B-2)

—$CH_2CH_2C_6F_{13}$ (B-3)

—$CH_2CH_2C_8F_{17}$ (B-4)

—$CH_2CH_2OCH_2CH_2C_4F_9$ (B-5)

—$CH_2CH_2OCH_2CH_2CH_2C_4F_9$ (B-6)

—$CH_2CH_2OCH_2CH_2C_6F_{13}$ (B-7)

—$CH_2CH_2OCH_2CH_2C_8F_{17}$ (B-8)

—$CH_2CH_2C_4F_8H$ (B-9)

—$CH_2CH_2CH_2C_4F_8H$ (B-10)

—$CH_2CH_2C_6F_{12}H$ (B-11)

—$CH_2CH_2C_8F_{16}H$ (B-12)

—$CH_2CH_2OCH_2CH_2C_4F_8H$ (B-13)

—$CH_2CH_2OCH_2CH_2CH_2C_4F_8H$ (B-14)

—$CH_2CH_2OCH_2CH_2C_6F_{12}H$ (B-15)

—$CH_2CH_2OCH_2CH_2C_8F_{16}H$ (B-16)

—$CH_2CH_2OCH_2CH_2C_5F_{10}H$ (B-17)

-continued

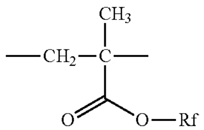

RF =

(B-18) $—CH_2CH_2C_4F_9$ (B-19) $—CH_2CH_2CH_2C_4F_9$ (B-20) $—CH_2CH_2C_6F_{13}$ (B-21) $—CH_2CH_2C_8F_{17}$ (B-22) $—CH_2CH_2OCH_2CH_2C_4F_9$ (B-23) $—CH_2CH_2OCH_2CH_2CH_2C_4F_9$ (B-24) $—CH_2CH_2OCH_2CH_2C_6F_{13}$ (B-25) $—CH_2CH_2OCH_2CH_2C_8F_{17}$ (B-26) $—CH_2CH_2C_4F_8H$ (B-27) $—CH_2CH_2CH_2C_4F_8H$ (B-28) $—CH_2CH_2C_6F_{12}H$ (B-29) $—CH_2CH_2C_8F_{16}H$ (B-30) $—CH_2CH_2OCH_2CH_2C_4F_8H$ (B-31) $—CH_2CH_2OCH_2CH_2CH_2C_4F_8H$ (B-32) $—CH_2CH_2OCH_2CH_2C_6F_{12}H$ (B-33) $—CH_2CH_2OCH_2CH_2C_8F_{16}H$ (B-34) $—CH_2CH_2OCH_2CH_2C_5F_{10}H$

In addition, in addition to the constitutional unit having the structure represented by Formula (A) and the constitutional unit derived from the fluoroaliphatic group-containing monomer that is represented by Formula (B), the fluoropolymer (X) used in the present invention may include a constitutional unit derived from a monomer that is copolymerizable with the monomer forming the constitutional unit.

The copolymerizable monomer is not particularly limited within a range not departing from the scope of the present invention. As the preferable monomer, for example, from the viewpoint of improving solubility in a solvent or preventing aggregation of a polymer, a monomer forming a hydrocarbon polymer (for example, polyethylene, polypropylene, polystyrene, polymaleimide, polyacrylic acid, polyacrylic acid ester, polyacrylamide, or polyacryl anilide), polyether, polyester, polycarbonate, polyamide, polyamic acid, polyimide, polyurethane, or polyureide can be preferably used.

Further, as the main chain structure, a constitutional unit that is the same as the unit having the group represented by Formula (A) is preferable.

Hereinafter, specific examples of the copolymerizable constitutional unit will be shown, but the present invention is not limited to the following specific examples. In particular, C-2, C-3, C-10, C-11, C-12, or C-19 is preferable, and C-11 or C-19 is more preferable.

(C-1)

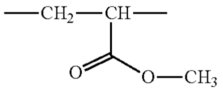

(C-2)

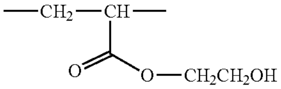

(C-3)

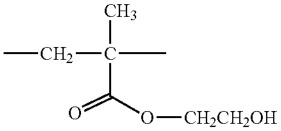

(C-4)

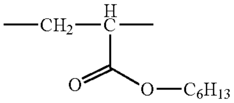

(C-5)

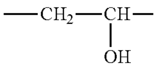

(C-6)

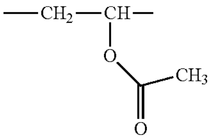

(C-7)

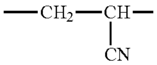

(C-8)

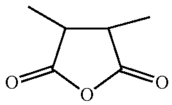

(C-9)

$—CH_2—CH_2—O—$ (C-10)

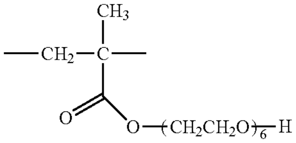

(C-11)

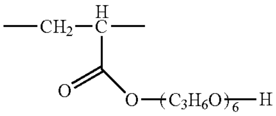

(C-12)

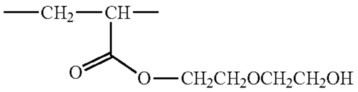

(C-13)

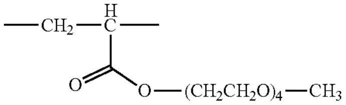

-continued (C-14)

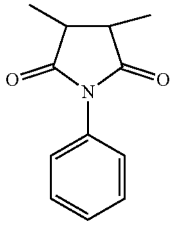

(C-15)

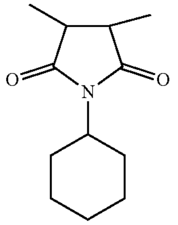

(C-16)

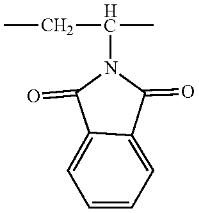

(C-17)

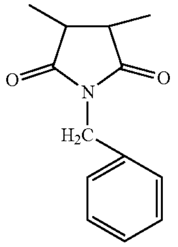

(C-18)

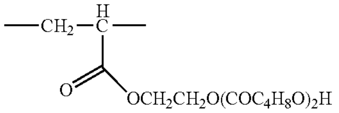

(C-19)

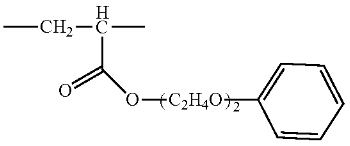

(C-20)

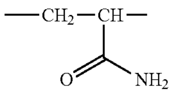

(C-21)

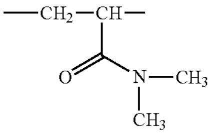

(C-22)

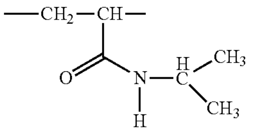

-continued (C-23)

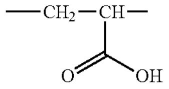

(C-24)

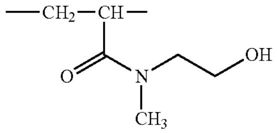

(C-25)

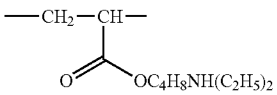

In the fluoropolymer (X), the content of the constitutional unit represented by Formula (A) is preferably 1 mass % to 90 mass % and more preferably 3 mass % to 80 mass %.

In addition, in the fluoropolymer (X), the content of the repeating unit derived from the fluoroaliphatic group-containing monomer (preferably the constitutional unit represented by Formula (B)) is preferably 5 mass to 90 mass % and more preferably 10 mass to 80 mass %.

The content of a constitutional unit other than the above-described two constitutional units is preferably 60 mass % or lower and more preferably 50 mass % or lower.

In addition, the fluoropolymer (X) may be a random copolymer into which the respective constitutional units are irregularly introduced or may be a block copolymer into which the respective constitutional units are regularly introduced. In a case where the fluoropolymer (X) is the block copolymer, the block copolymer may be synthesized by introducing the respective constitutional units in any introduction order or by using the same component twice or more.

In addition, as the constitutional unit represented by Formula (A), the constitutional unit represented by Formula (B), or the like, only one kind may be used, or two or more kinds may be used. In a case where two or more constitutional units represented by Formula (A) are included, it is preferable that X represents the same fused ring skeleton (a combination of a substituted group and an unsubstituted group). In a case where two or more constitutional units are included, the content refers to a total content.

Further, the range of the number-average molecular weight (Mn) of the fluoropolymer (X) is preferably 1000 to 1000000, more preferably 3000 to 200000, and still more preferably 5000 to 100000. In addition, a molecular weight distribution (Mw/Mn; Mw represents a weight-average molecular weight) of the polymer used in the present invention is preferably 1 to 4 and more preferably 1.5 to 4.

Here, the number-average molecular weight can be measured as a value in terms of polystyrene (PS) obtained by gel permeation chromatography (GPC).

<Fluoropolymer (Y)>

The fluoropolymer (Y) includes a polar group without including the constitutional unit represented by Formula (A).

Here, the polar group refers to a group having at least one heteroatom or at least one halogen atom, and specific examples thereof include a hydroxyl group, a carbonyl group, a carboxy group, an amino group, a nitro group, an ammonium group, and a cyano group. Among these, a hydroxyl group or a carboxy group is preferable.

In the present invention, it is preferable that the fluoropolymer (Y) includes a constitutional unit represented by the following Formula (C).

(C)

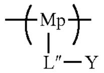

(In Formula (C), Mp represents a trivalent group forming a part of a polymer main chain, L represents a single bond or a divalent linking group, and Y represents a polar group.)

Mp in Formula (C) has the same definition and the same preferable range as Mp in Formula (A). In a case where L" (a single bond or a divalent linking group) represents a divalent linking group, it is preferable that the divalent linking group is a divalent linking group represented by *-L1-L3- (* represents a linking site to a main chain) where L1 represents *—COO—, *—CONH—, *—OCO—, or *—NHCO— and L3 represents an alkylene group having 2 to 20 carbon atoms, a polyoxyalkylene group having 2 to 20 carbon atoms, —C(═O)—, —OC(═O)O—, an aryl group, or a divalent linking group including a combination thereof.

Among these, it is preferable that L" represents a single bond; a divalent linking group where L1 represents *—COO and L3 represents a divalent linking group including a combination of an alkylene group, —OC(═O)O—, and an aryl group; or a divalent linking group where L1 represents *—COO— and L3 represents a polyoxyalkylene group having 2 to 20 carbon atoms.

In addition, examples of the polar group represented by Y in Formula (C) include a hydroxyl group, a carbonyl group, a carboxy group, an amino group, a nitro group, an ammonium group, and a cyano group. Among these, a hydroxyl group, a carboxy group, or a cyano group is preferable.

In addition, as in the fluoropolymer (X), in addition to the constitutional unit represented by Formula (C), it is preferable that the fluoropolymer (Y) includes, for example, a constitutional unit derived from a fluoroaliphatic group-containing monomer, and it is more preferable that the fluoropolymer (X) includes a constitutional unit represented by Formula (B).

Likewise, as in the fluoropolymer (X), in addition to the constitutional unit having the structure represented by Formula (C) and the constitutional unit derived from the fluoroaliphatic group-containing monomer that is represented by Formula (B), the fluoropolymer (Y) may include a constitutional unit derived from a monomer that is copolymerizable with the monomer forming the constitutional unit.

In the fluoropolymer (Y), the content of the constitutional unit represented by Formula (C) is preferably 45 mass % or lower, more preferably 1 to 20 mass %, and still more preferably 2 to 10 mass %.

In addition, in the fluoropolymer (Y), the content of the repeating unit derived from the fluoroaliphatic group-containing monomer (preferably the constitutional unit represented by Formula (B)) is preferably 55 mass % or higher, more preferably 80 to 99 mass % and more preferably 90 to 98 mass %. The content of a constitutional unit other than the above-described two constitutional units is preferably 60 mass % or lower and more preferably 50 mass % or lower.

In addition, the fluoropolymer (Y) may be a random copolymer into which the respective constitutional units are irregularly introduced or may be a block copolymer into which the respective constitutional units are regularly introduced. In a case where the fluoropolymer (Y) is the block copolymer, the block copolymer may be synthesized by introducing the respective constitutional units in any introduction order or by using the same component twice or more.

In addition, as the constitutional unit represented by Formula (C), the constitutional unit represented by Formula (B), or the like, only one kind may be used, or two or more kinds may be used. In a case where two or more constitutional units represented by Formula (C) are included, it is preferable that Y represents the same polar group. In a case where two or more constitutional units are included, the content refers to a total content.

Further, the range of the weight-average molecular weight (Mw) of the fluoropolymer (Y) is preferably 10000 to 35000 and more preferably 15000 to 30000.

Here, the weight-average molecular weight can be measured as a value in terms of polystyrene (PS) obtained by gel permeation chromatography (GPC).

(Mass Ratio between Fluoropolymer (X) and Fluoropolymer (Y) (A:B))

The mass ratio is preferably 98:2 to 2:98, more preferably 98:2 to 55:45, and still more preferably 98:2 to 60:40.

In the present invention, the content of the air interface alignment agent including the fluoropolymer (X) and the fluoropolymer (Y) is preferably 0.2 mass % to 10 mass %, more preferably 0.2 mass % to 5 mass %, and still more preferably 0.2 mass % to 3 mass % with respect to the total solid content of the liquid crystal composition.

[Other Components]

The liquid crystal composition may include components other than the liquid crystal compound and the photo-alignment compound.

For example, the liquid crystal composition may include a polymerization initiator.

As the polymerization initiator, for example, a thermal polymerization initiator or a photopolymerization initiator can be used depending on the type of the polymerization reaction. Examples of the photopolymerization initiator include an α-carbonyl compound, acyloin ether, an α-hydrocarbon-substituted aromatic acyloin compound, a polynuclear quinone compound, a combination of a triarylimidazole dimer and p-aminophenyl ketone, acridine, a phenazine compound, and an oxadiazole compound.

The amount of the polymerization initiator used is preferably 0.01 to 20 mass % and more preferably 0.5 to 5 mass % with respect to the total solid content of the composition.

In addition from the viewpoints of the uniformity of the coating film and the strength of the film, the liquid crystal composition may include a polymerizable monomer.

Examples of the polymerizable monomer include a radically polymerizable compound or a cationically polymerizable compound. The polymerizable monomer is preferably a polyfunctional radically polymerizable monomer and is preferably copolymerizable with the disk-like liquid crystal compound having the polymerizable group. For example, compounds described in paragraphs "0018" to "0020" in JP2002-296423A can be used.

The addition amount of the polymerizable monomer is preferably 1 to 50 parts by mass and more preferably 5 to 30 parts by mass with respect to 100 parts by mass of the liquid crystal compound.

In addition from the viewpoints of the uniformity of the coating film and the strength of the film, the liquid crystal composition may include a surfactant.

Examples of the surfactant include a well-known compound of the related art. In particular, a fluorine compound is preferable. Specific examples of the surfactant include a compound described in paragraphs "0028" to "0056" of JP2001-330725A and a compound described in paragraphs "0069" to "0126" of JP2003-295212A.

In addition, the liquid crystal composition may include a solvent and preferably an organic solvent.

Examples of the organic solvent include amides (for example, N,N-dimethylformamide), sulfoxides (for example, dimethyl sulfoxide), heterocyclic compounds (for example, pyridine), hydrocarbons (for example, benzene, or hexane), alkyl halides (for example, chloroform or dichloromethane), esters (for example, methyl acetate, ethyl acetate, or butyl acetate), ketones (for example, acetone or methyl ethyl ketone), and ethers (for example, tetrahydrofuran or 1,2-dimethoxyethane). Alkyl halide or ketone is preferable. Two or more organic solvents may be used in combination.

<<Onium Salt>>

In a case where the liquid crystal composition is applied to the alignment film, it is preferable that the composition includes at least one onium salt in order to provide the region having a pretilt angle on the alignment film side. The onium salt contributes to providing a constant pretilt angle to molecules of the rod-like liquid crystal compound on the alignment film interface side. Examples of the onium salt include an onium salt such as an ammonium salt, a sulfonium salt, or a phosphonium salt. A quaternary onium salt is preferable, and a quaternary ammonium salt is more preferable.

In general, the quaternary ammonium salt can be obtained by alkylation (Menschutkin reaction), alkenylation, alkynylation, or arylation of a tertiary amine (for example, trimethylamine, triethylamine, tributylamine, triethanolamine, N-methylpyrrolidine, N-methylpiperidine, N,N-dimethylpiperazine, triethylenediamine, or N,N,N',N'-tetramethylethylenediamine) or a nitrogen-containing heterocycle (for example, a pyridine ring, a picoline ring, a 2,2'-bipyridyl ring, a 4,4'-bipyridyl ring, a 1,10-phenanthroline ring, a quinoline ring, an oxazole ring, a thiazole ring, a N-methylimidazole ring, a pyrazine ring, or a tetrazole ring).

As the quaternary ammonium salt, a quaternary ammonium salt consisting of a nitrogen-containing heterocycle is preferable, and a quaternary pyridinium salt is more preferable.

More specifically, it is preferable that the quaternary ammonium salt is a quaternary pyridinium salt represented by the following Formula (3a) or Formula (3b).

Formula (3a)

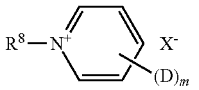

In Formula (3a), $R^8$ represents an alkyl group, an alkenyl group, an alkynyl group, an aralkyl group, an aryl group, or a heterocyclic group that is substituted or unsubstituted, D represents a hydrogen-bonding group, m represents an integer of 1 to 3, and X— represents an anion.

First, Formula (3a) will be described.

As the alkyl group represented by $R^8$, a substituted or unsubstituted alkyl group having 1 to 18 carbon atoms is preferable, and a substituted or unsubstituted alkyl group having 1 to 8 carbon atom is more preferable. The alkyl group may be linear, branched, or cyclic. Examples of the alkyl group include methyl, ethyl, n-propyl, isopropyl, n-butyl, isobutyl, t-butyl, n-hexyl, n-octyl, neopentyl, cyclohexyl, adamantyl, and cyclopropyl.

Examples of a substituent of the alkyl group are as follows: a substituted or unsubstituted alkenyl group (for example, vinyl) having 2 to 18 carbon atoms (preferably 2 to 8 carbon atoms); a substituted or unsubstituted alkynyl group (for example, ethynyl) having 2 to 18 carbon atoms (preferably 2 to 8 carbon atoms); a substituted or unsubstituted aryl group (for example, phenyl or naphthyl) having 6 to 10 carbon atoms; a halogen atom (for example, F, Cl, or Br), a substituted or unsubstituted alkoxy group (for example, methoxy or ethoxy) having 1 to 18 carbon atoms (preferably 1 to 8 carbon atoms); a substituted or unsubstituted aryloxy group (for example, phenoxy, biphenyloxy, or p-methoxyphenoxy) having 6 to 10 carbon atoms; a substituted or unsubstituted alkylthio group (for example, methylthio or ethylthio) having 1 to 18 carbon atoms (preferably 1 to 8 carbon atoms); a substituted or unsubstituted arylthio group (for example, phenylthio) having 6 to 10 carbon atoms; a substituted or unsubstituted acyl group (for example, acetyl or propionyl) having 2 to 18 carbon atoms (preferably 2 to 8 carbon atoms);

a substituted or unsubstituted alkylsulfonyl group or arylsulfonyl group (for example, methanesulfonyl or p-toluenesulfonyl) having 1 to 18 carbon atoms (preferably 1 to 8 carbon atoms); a substituted or unsubstituted acyloxy group (for example, acetoxy or propionyloxy) having 2 to 18 carbon atoms (preferably 2 to 8 carbon atoms); a substituted or unsubstituted alkoxycarbonyl group (for example, methoxycarbonyl or ethoxycarbonyl) having 2 to 18 carbon atoms (preferably 2 to 8 carbon atoms); a substituted or unsubstituted aryloxycarbonyl group (for example, naphthoxycarbonyl) having 7 to 11 carbon atoms; an unsubstituted amino group or a substituted amino group (for example, methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, ethylthiocarbamoylamino, phenylcarbamoylamino, acetylamino, ethylcarbonylamino, ethylthiocarbamoylamino, cyclohexylcarbonylamino, benzoylamino, chloroacetylamino, or methylsulfonylamino) having 1 to 18 carbon atoms (preferably 1 to 8 carbon atoms);

a substituted or unsubstituted carbamoyl group (for example, unsubstituted carbamoyl, methylcarbamoyl, ethylcarbamoyl, n-butylcarbamoyl, t-butylcarbamoyl, dimethylcarbamoyl, morpholinocarbamoyl, or pyrrolidinocarbamoyl) having 1 to 18 carbon atoms (preferably 1 to 8 carbon atoms); an unsubstituted sulfamoyl group or a substituted sulfamoyl group (for example, methylsulfamoyl or phenylsulfamoyl) having 1 to 18 carbon atoms (preferably 1 to 8 carbon atoms); a cyano group; a nitro group; a carboxy group; a hydroxyl group; and a heterocyclic group (for example, an oxazole ring, a benzoxazole ring, a thiazole ring, a benzothiazole ring, an imidazole ring, a benzimidazole ring, an indolenine ring, a pyridine ring, a piperidine ring, a pyrrolidine ring, a morpholine ring, a sulfolane ring, a furan ring, a thiophene ring, a pyrazole ring, a pyrrole ring, a chroman ring, or a coumarin ring). As the substituent of the alkyl group, an aryloxy group, an arylthio group, an arylsulfonyl group, or an aryloxycarbonyl group is preferable.

As the alkenyl group represented by $R^8$, a substituted or unsubstituted alkenyl group having 2 to 18 carbon atoms is preferable, a substituted or unsubstituted alkenyl group having 2 to 8 carbon atom is more preferable, and examples thereof include vinyl, aryl, 1-propenyl, and 1,3-butadienyl. As a substituent of the alkenyl group, the above-described examples of the substituent of the alkyl group are preferable.

As the alkynyl group represented by $R^8$, a substituted or unsubstituted alkynyl group having 2 to 18 carbon atoms is preferable, a substituted or unsubstituted alkynyl group having 2 to 8 carbon atom is more preferable, and examples thereof include ethynyl and 2-propynyl. As a substituent of the alkynyl group, the above-described examples of the substituent of the alkyl group are preferable.

As the aralkyl group represented by R, a substituted or unsubstituted aralkyl group having 7 to 18 carbon atoms is preferable. For example, benzyl, methylbenzyl, biphenylmethyl, or naphthylmethyl is preferable. Examples of a substituent of the aralkyl group include the above-described examples of the substituent of the alkyl group.

As the aryl group represented by $R^8$, a substituted or unsubstituted aryl group having 6 to 18 carbon atoms is preferable, and examples thereof include phenyl, naphthyl, and fluorenyl. As a substituent of the aryl group, the above-described examples of the substituent of the alkyl group are preferable. In addition, an alkyl group (for example, methyl or ethyl), an alkynyl group, or a benzoyl group is also preferable.

The heterocyclic group represented by $R^8$ is 5- or 6-membered ring saturated or unsaturated heterocycle including a carbon atom, a nitrogen atom, an oxygen atom, or a sulfur atom, and examples thereof include an oxazole ring, a benzoxazole ring, a thiazole ring, a benzothiazole ring, an imidazole ring, a benzimidazole ring, an indolenine ring, a pyridine ring, a piperidine ring, a pyrrolidine ring, a morpholine ring, a sulfolane ring, a furan ring, a thiophene ring, a pyrazole ring, a pyrrole ring, a chroman ring, and a coumarin ring. The heterocyclic group may be substituted. In this case, as a substituent of the alkyl group, the above-described examples of the substituent of the alkyl group are preferable. As the heterocyclic group represented by $R^8$, a benzoxazole ring or a benzothiazole ring is preferable.

It is preferable that $R^8$ represents an alkyl group, an aralkyl group, an aryl group, or a heterocyclic group that is substituted or unsubstituted.

D represents a hydrogen-bonding group. A hydrogen bond is present between hydrogen atoms that form a covalent bond between an electronegative atom (for example, O, N, F, Cl) and an electronegative atom. A theoretical explanation for a hydrogen bond is reported in, for example, H. Uneyama and K. Morokuma, Journal of American Chemical Society, Vol 99, pp. 1316 to 1332, 1977. Specific examples of the form of a hydrogen bond include a form shown in FIG. 17, p. 98, Intermolecular Force and Surface Force, J. N. Israerachiviri, translated by Kondo Tamotsu and Oshima Hiroyuki, McGraw-Hill (1991). Specific examples of the hydrogen bond include examples described in G. R. Desiraju, Angewandte Chemistry International Edition English, Vol. 34, p. 2311, 1995.

Preferable examples of the hydrogen-bonding group include a mercapto group, a hydroxy group, an amino group, a carbonamide group, a sulfonamide group, an acid amido group, an ureido group, a carbamoyl group, a carboxyl group, a sulfo group, a nitrogen-containing heterocyclic group (for example, an imidazolyl group, a benzimidazolyl group, a pyrazolyl group, a pyridyl group, a 1,3,5-triazine group, a pyrimidyl group, a pyridazyl group, a quinolyl group, a benzimidazolyl group, a benzothiazolyl group, a succinimide group, a phthalimido group, a maleimide group, an uracil group, a thiouracil group, a barbituric acid group, a hydantoin group, a maleic hydrazide group, an isatin group, and an uramil group). Preferable examples of the hydrogen-bonding group include an amino group, a carbonamide group, a sulfonamide group, an ureido group, a carbamoyl group, a carboxyl group, a sulfo group, and a pyridyl group. Among these, an amino group, a carbamoyl group, or a pyridyl group is more preferable.

The anion represented by X— may be an inorganic anion or an organic anion, and examples thereof include a halogen anion (for example, a fluoride ion, a chloride ion, a bromide ion, or an iodide ion), a sulfonate ion (for example, a methanesulfonate ion, a trifluoromethanesulfonate ion, a methyl sulfate ion, a p-toluenesulfonate ion, a p-chlorobenzenesulfonate ion, a 1,3-benzenedisulfonate ion, a 1,5-naphthalenedisulfonate ion, or a 2,6-naphthalenedisulfonate ion), a sulfate ion, a thiocyanate ion, a perchlorate ion, a tetrafluoroborate ion, a picrate ion, an acetate ion, a phosphate ion (for example, a hexafluorophosphate ion), and a hydroxyl ion. It is preferable that X— represents a halogen anion, a sulfonate ion, or a hydroxyl ion. X— is not necessarily a monovalent anion and may be a divalent or higher anion. In this case, a ratio between a cation and an anion in the compound is not necessarily 1:1 and may be appropriately determined.

In Formula (3a) m represents preferably 1.

In addition, it is more preferable that the quaternary ammonium salt represented by Formula (3a) is represented by the following Formula (4).

Formula (4)

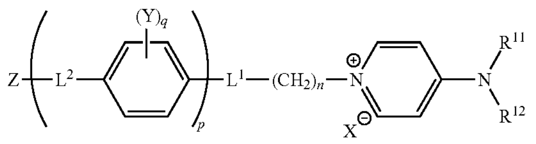

In Formula (4), $L^1$ and $L^2$ each independently represent a divalent linking group or a single bond.

The divalent linking group is a substituted or unsubstituted alkylene group (for example, a methylene group, an ethylene group, or a 1,4-butylene group) having 1 to 10 carbon atoms, —O—, —C(═O)—, —C(═O)O—, —OC(═O)O—, —S—, —NR'—, —C(═O)NR"—, —S(═O)$_2$—, or a divalent linking group obtained by linking two or more of the above-described groups, and R' and R" represent a hydrogen atom or a substituted or unsubstituted alkyl group. In a case where the divalent linking group is bilaterally asymmetric (for example, —C(═O)O—), linking may be performed in any direction.

Y represents a substituent other than a hydrogen atom substituted with a phenyl group. Examples of the substituent represented by Y include a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, an alkoxy group, an aryloxy group, an acyloxy group, a carbamoyloxy group, an amino group (including an anilino group), an acylamino group, a sulfamoylamino group, a mercapto group, an alkylthio group, an arylthio group, an acyl group, an aryloxycarbonyl group, an alkoxycarbonyl group, and a carbamoyl group.

$R^{11}$ and $R^{12}$ represent a hydrogen atom, an alkyl group, an aryl group, an acyl group, a carbamoyl group, a hydroxyl group, or an amino group. In addition, $R^{11}$ and $R^{12}$ may be linked to each other to form a ring.

Z represents a hydrogen atom, a substituted or unsubstituted aliphatic hydrocarbon group (for example, an alkyl group having 1 to 30 carbon atoms or an alkenyl group having 2 to 30 carbon atoms), or a substituted or unsubstituted aryl group (for example, a phenyl group having 6 to 30 carbon atoms), n and p represent an integer of 1 to 10, and q represents an integer of 0 to 4. However, in a case where p represents 2 or more, L2's, Y's, and q's included in the repeating units thereof may be the same as or different from each other.

Hereinafter, the preferable quaternary ammonium represented by Formula (4) will be described in detail.

In Formula (4), as the divalent linking group represented by $L^1$, —O— or a single bond is preferable. As the divalent linking group represented by $L^2$, —O—, —C(═O)O—, —OC(═O)O—, or a single bond is preferable.

As the substituent represented by Y in Formula (4), a halogen atom (for example, a fluorine atom, a chlorine atom, a bromine atom, or an iodine atom) or an alkyl group (a linear, branched, or cyclic substituted or unsubstituted alkyl group is preferable, and an alkyl group (preferably an alkyl group having 1 to 30 carbon atoms, for example, methyl, ethyl, n-propyl, isopropyl, t-butyl, n-octyl, 2-chloroethyl, 2-cyanoethyl, or 2-ethylhexyl), an alkoxy group (for example, a methoxy group or an ethoxy group), or a cyano group is more preferable.

In Formula (4), $R^{11}$ and $R^{12}$ represent preferably a substituted or unsubstituted alkyl group and most preferably a methyl group.

In Formula (4), p represents preferably 1 to 5 and more preferably 2 to 4, n represents preferably 1 to 4 and more preferably 1 or 2, and q represents 0 or 1. In a case where p represents 2 or more, it is more preferable that q represents 1 or more in at least one constitutional unit.

Next, Formula (3b) will be described.

Formula (3b)

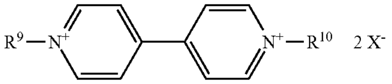

In Formula (3b), $R^9$ and $R^{10}$ each independently represents an alkyl group, an alkenyl group, an alkynyl group, an aralkyl group, an aryl group, or a heterocyclic group that is substituted or unsubstituted, and X— represents an anion. The alkyl group, the alkenyl group, the alkynyl group, the aralkyl group, the aryl group, or the heterocyclic group that is substituted or unsubstituted and is represented by each of $R^9$ and $R^{10}$ has the same definition and the same preferable range as the group represented by $R^8$ in Formula (3a). The anion represented by X— has the same definition and the same preferable range as the anion represented by X— in Formula (3a). As described above, X— is not necessarily a monovalent anion and may be a divalent or higher anion. In this case, a ratio between a cation and an anion in the compound is not necessarily 1:2 and may be appropriately determined.

Specific examples of the onium salt that can be used in the present invention will be shown below, but the onium salt used in the present invention is not limited to these examples. In the following specific examples, No. II-1 to II-12 are examples of the compound represented by Formula (3b), and No. II-13 to II-32 are examples of the compound represented by Formula (3a).

II-1

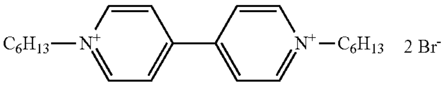

II-2

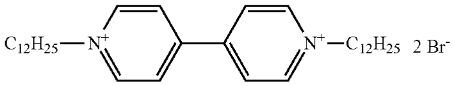

II-3

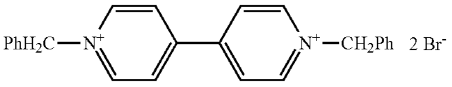

II-4

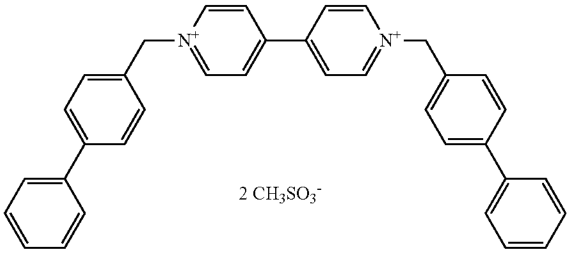

II-5

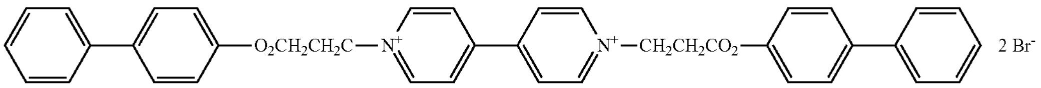

II-6

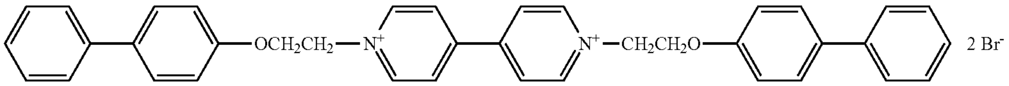

II-7

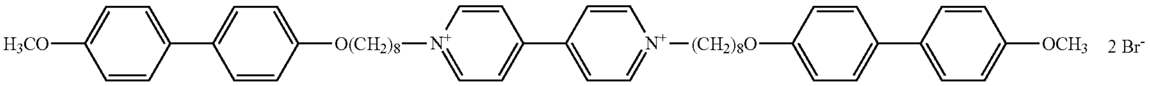

-continued
II-8
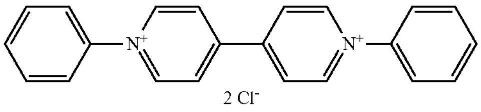
II-9
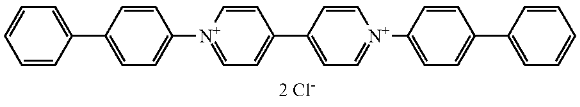
II-10
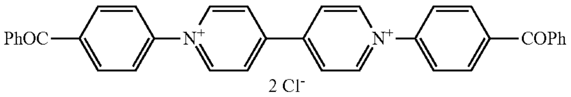
II-11
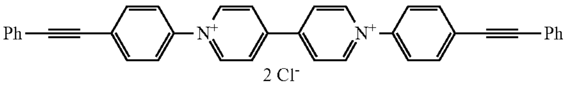
II-12
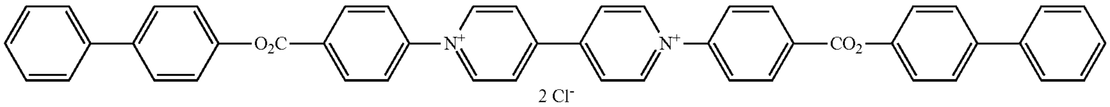
II-13
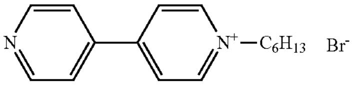
II-14
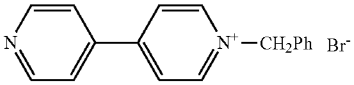
II-15
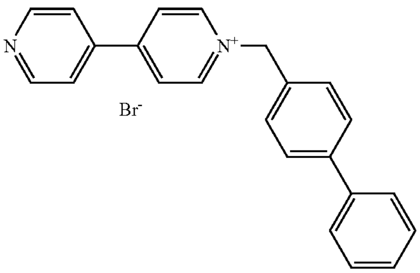
II-16
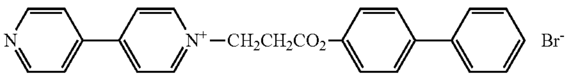
II-17
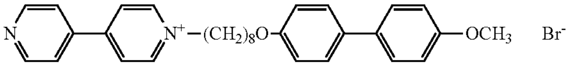
II-18
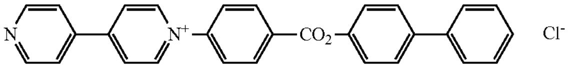
II-19
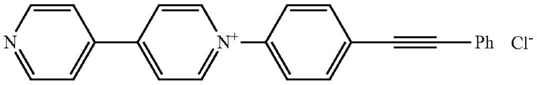
II-20
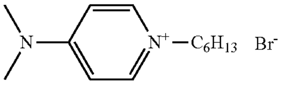
II-21
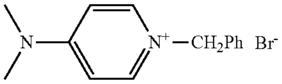
II-22
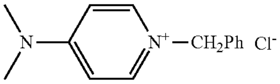
II-23
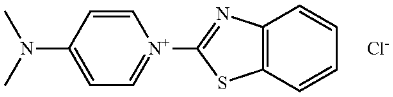
II-24
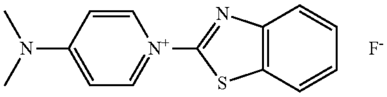
II-25
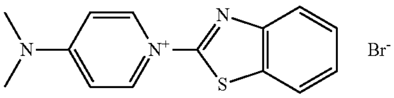
II-26
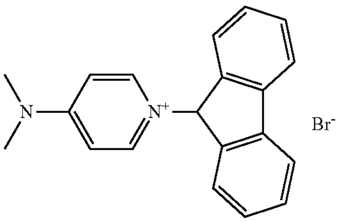
II-27
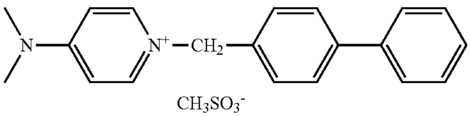
II-28
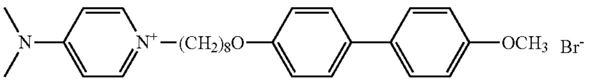

-continued
II-29
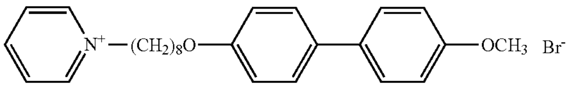
II-30
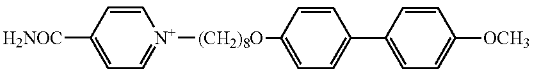
II-31
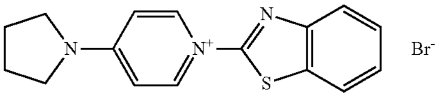
II-32
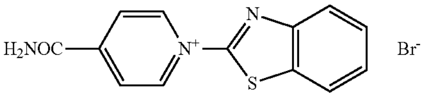
II-33
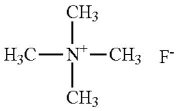
II-34
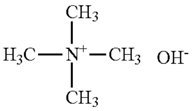
II-35
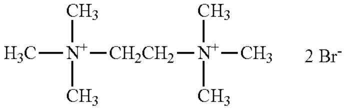
II-36
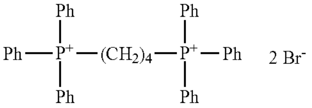
II-37
$Ph_3P^+Me\ Br^-$
II-38
$Ph_4P^+Me\ Br^-$
In addition, quaternary ammonium salts of the following (1) to (60) are also preferable.
(1)
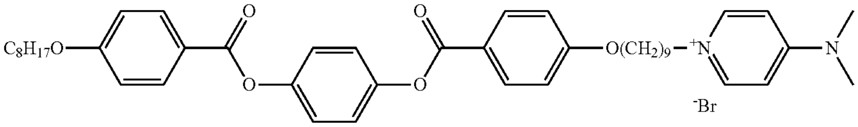
(2)
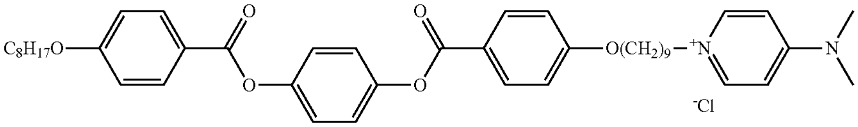
(3)
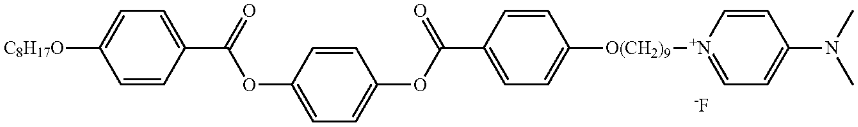
(4)
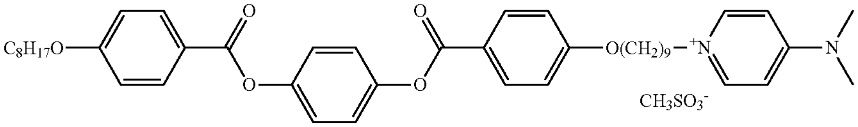
(5)
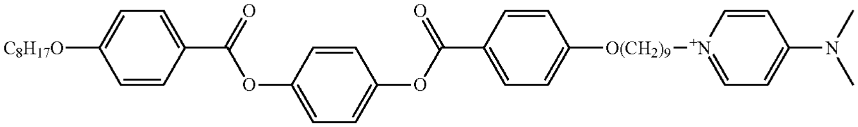
(6)
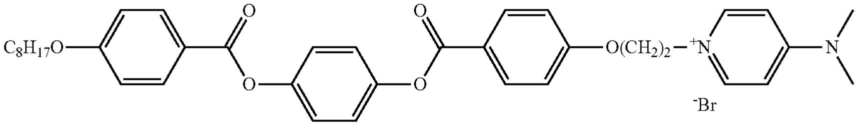

-continued
(7)
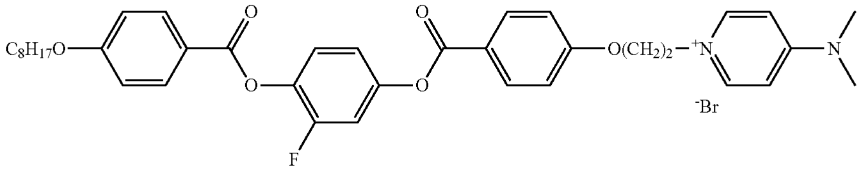
(8)
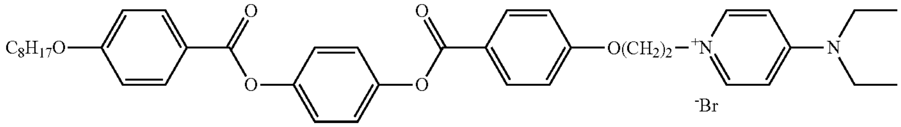
(9)
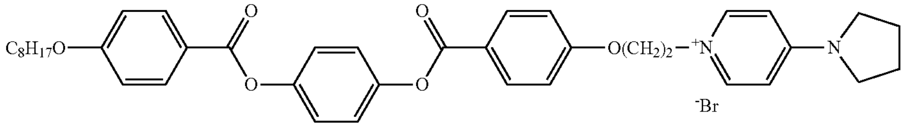
(10)
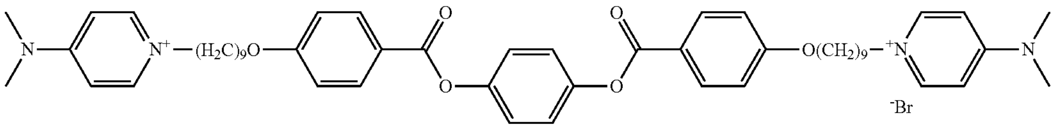
(11)
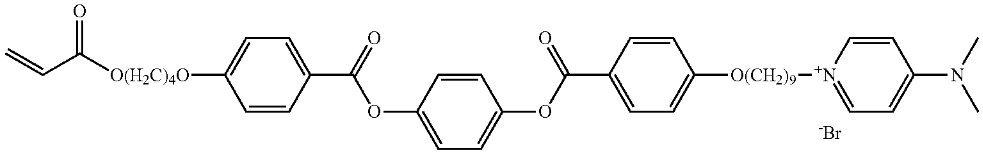
(12)
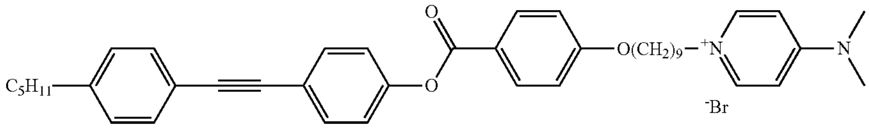
(13)
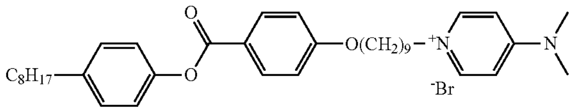
(14)
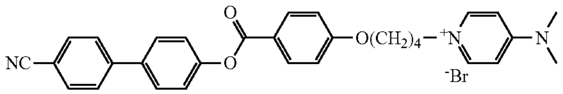
(15)
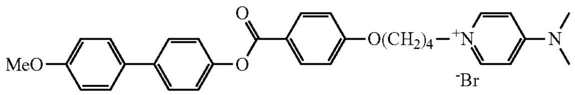
(16)
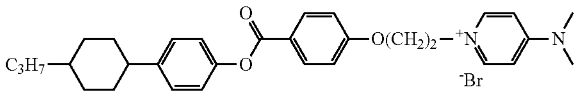
(17)
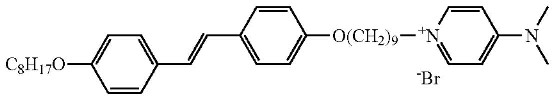
(18)
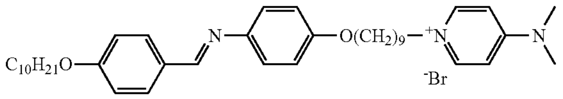
(19)
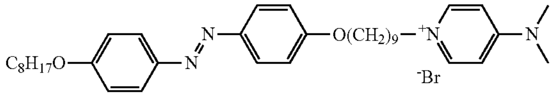
(20)
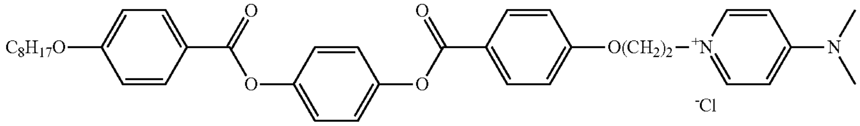

-continued
(21)
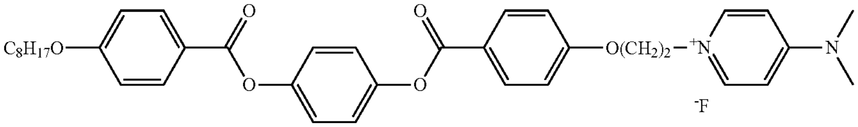
(22)
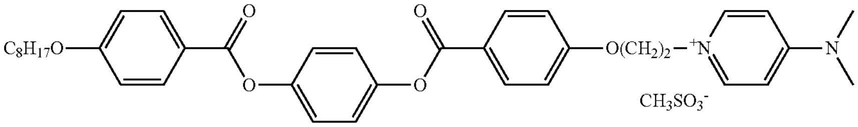
(23)
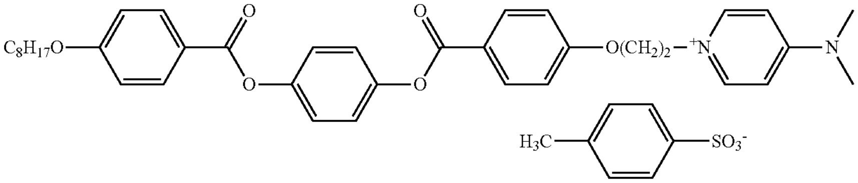
(24)
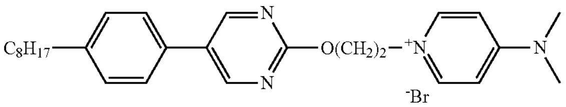
(25)
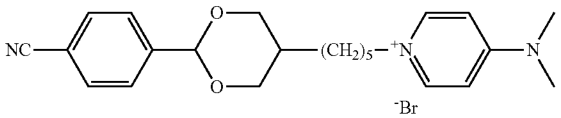
(26)
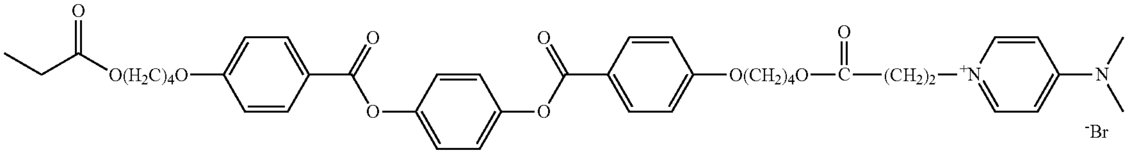
(27)
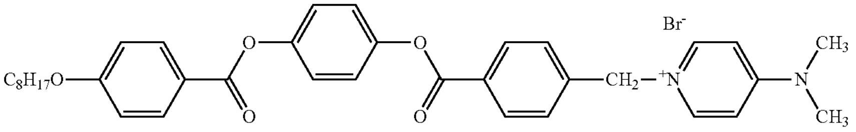
(28)
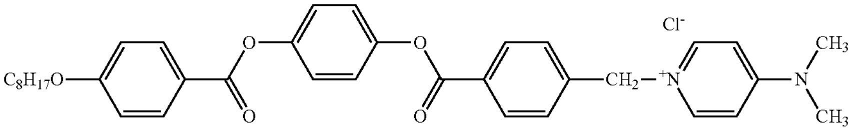
(29)
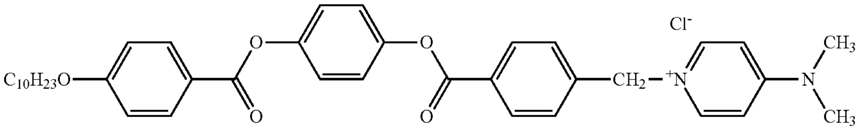
(30)
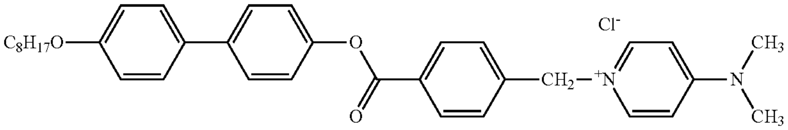
(31)
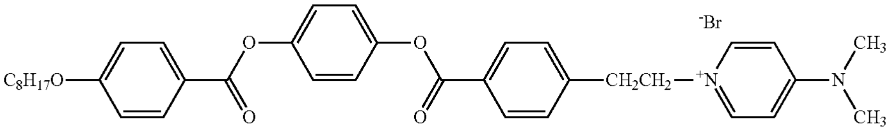

-continued
(32)
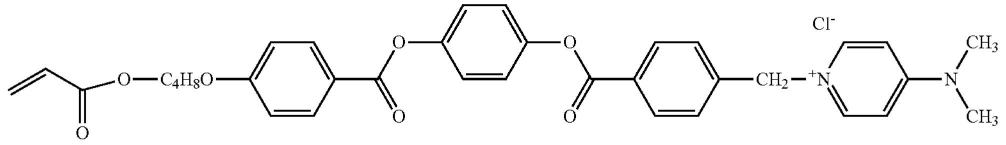
(33)
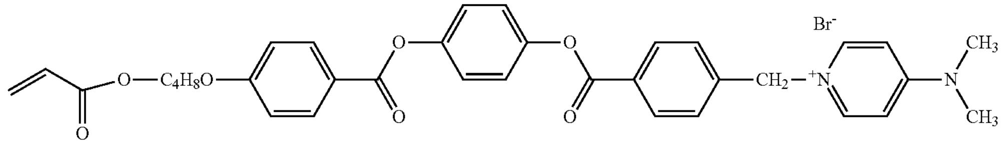
(34)
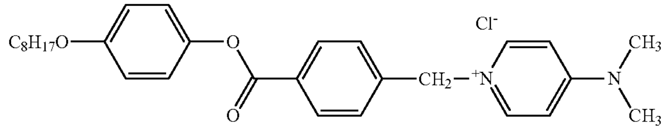
(35)
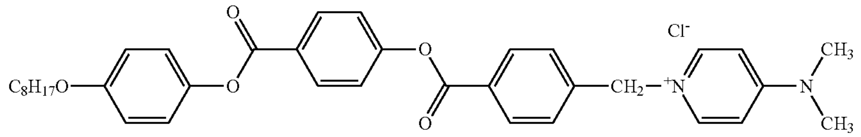
(36)
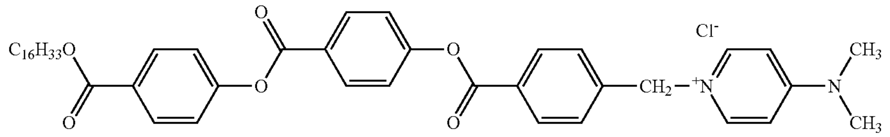
(37)
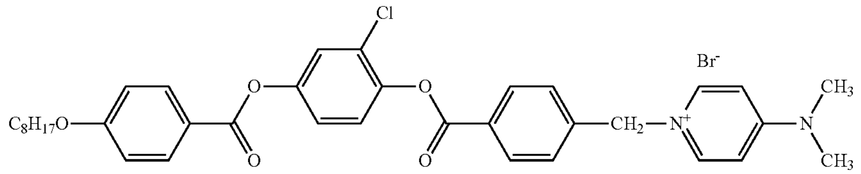
(38)
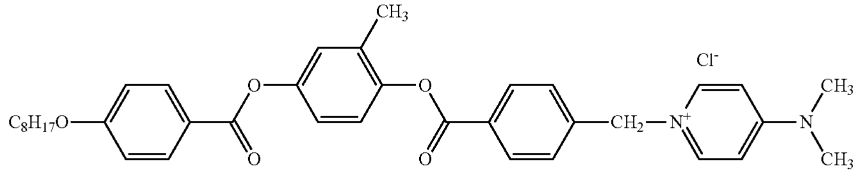
(39)
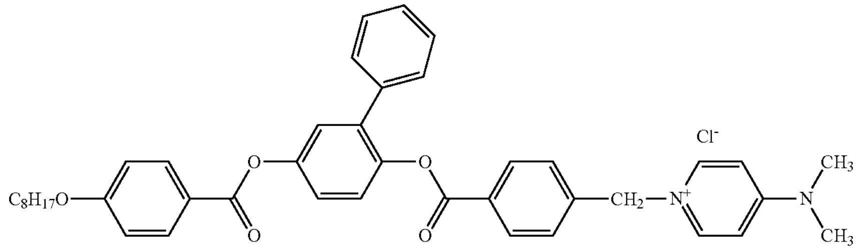
(40)
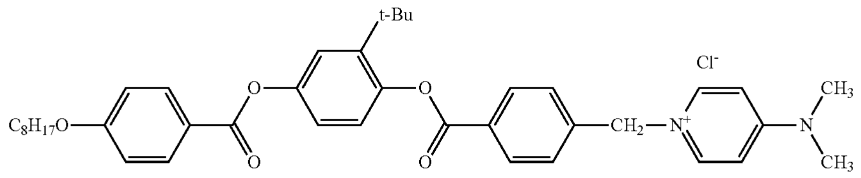

-continued
(41)
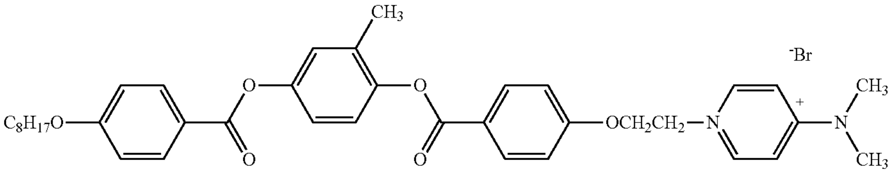
(42)
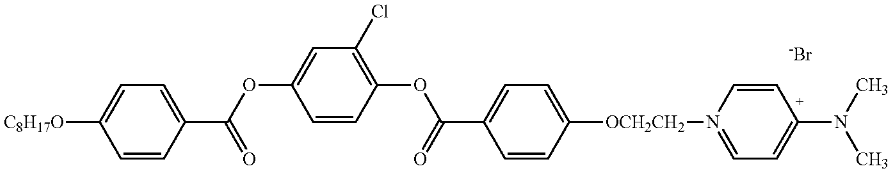
(43)
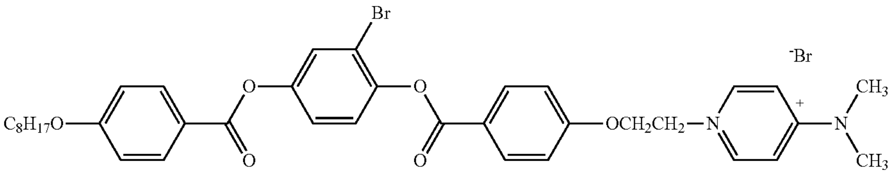
(44)
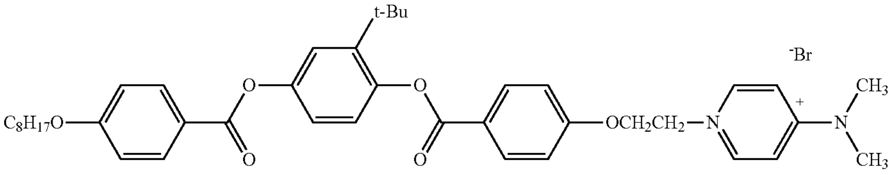
(45)
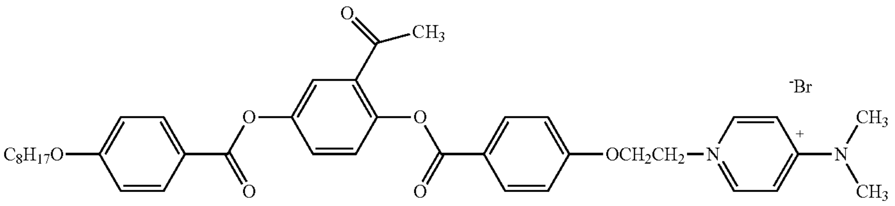
(46)
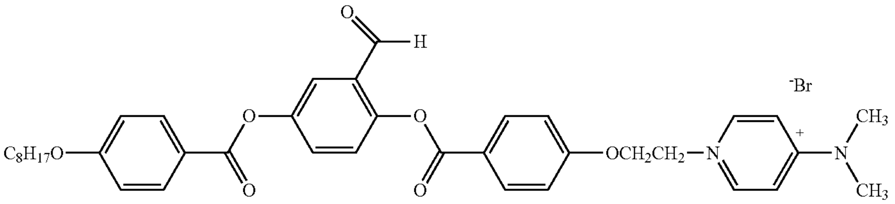
(47)
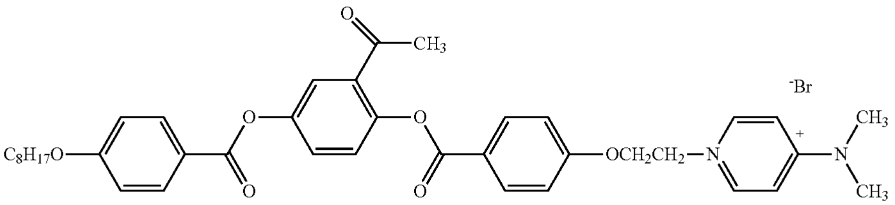
(48)
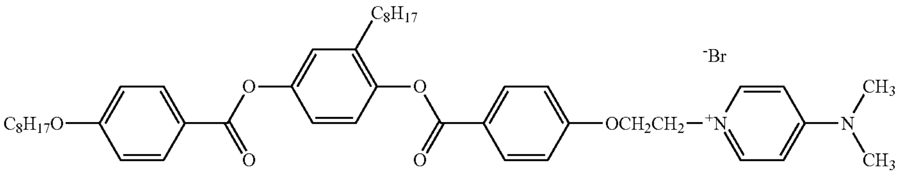

-continued
(49)
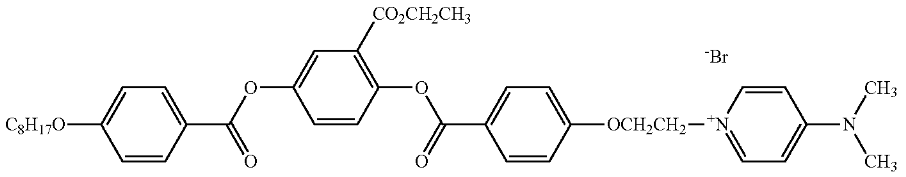
(50)
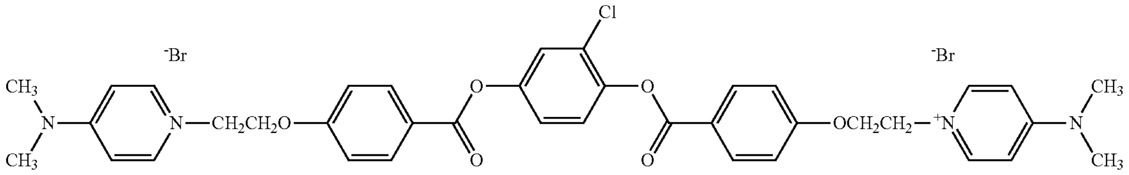
(51)
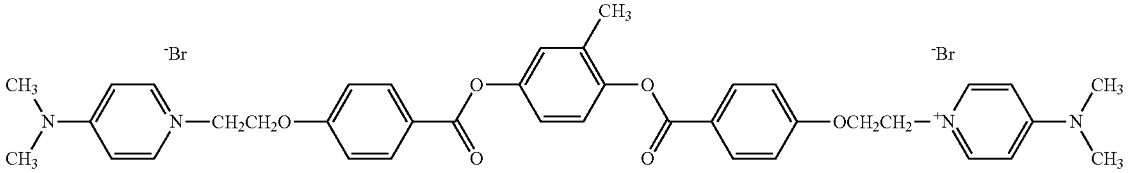
(52)
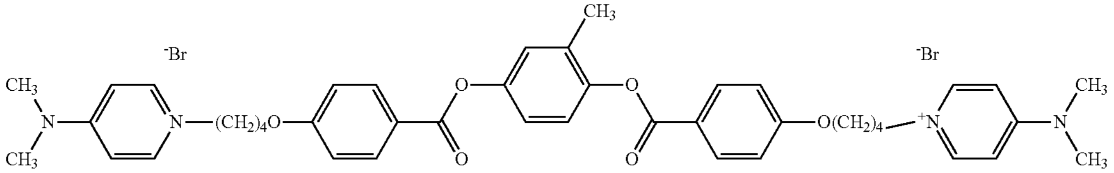
(53)
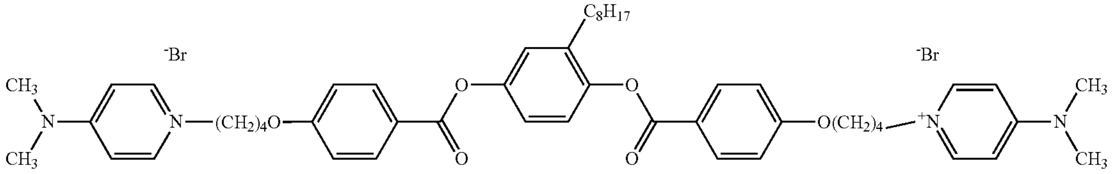
(54)
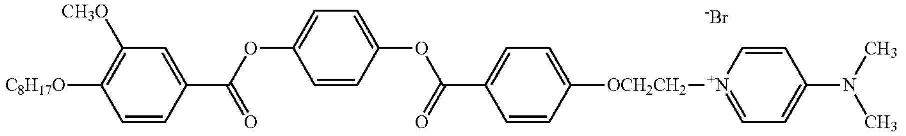
(55)
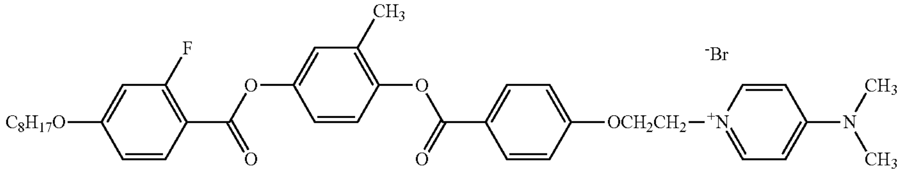
(56)
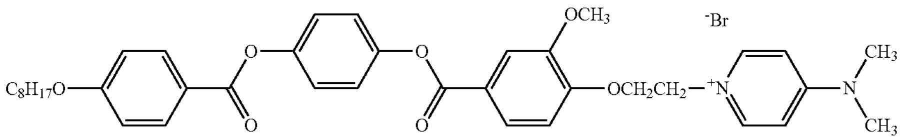
(57)
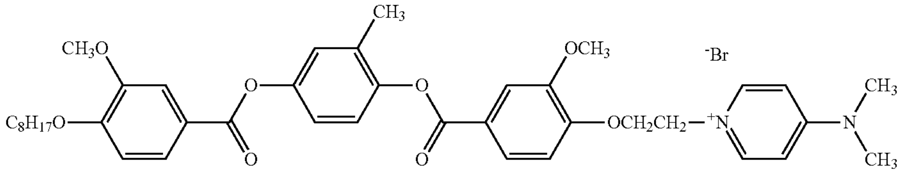

-continued (58)

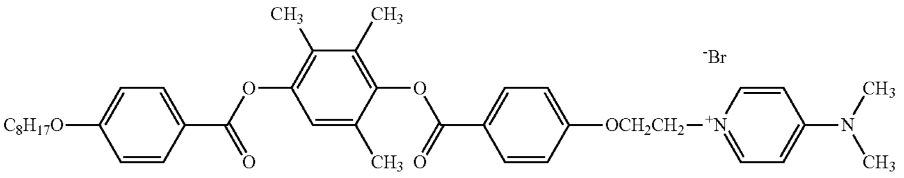

(59)

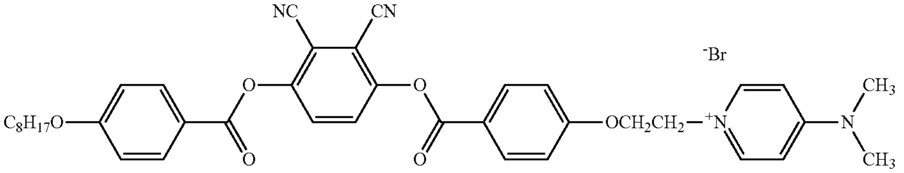

(60)

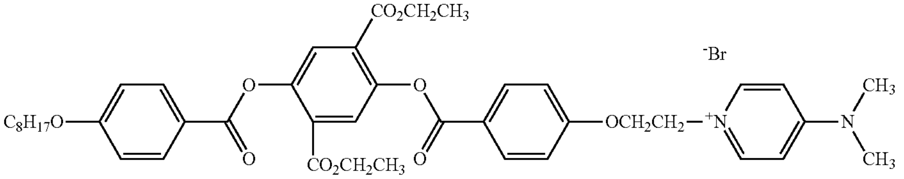

(61)

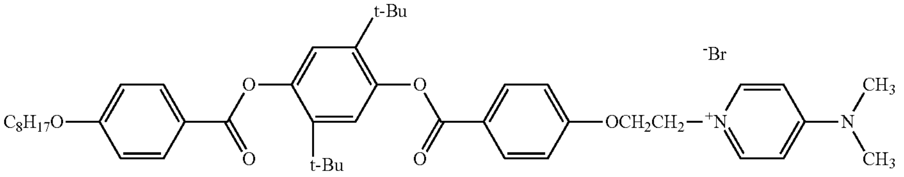

The pyridinium derivative is obtained by alkylation (Menschutkin reaction) of a pyridine ring.

The preferable content of the onium salt in the liquid crystal composition varies depending on the kind thereof, and typically is preferably 0.01 to 10 mass %, more preferably 0.05 to 7 mass %, and still more preferably 0.05 to 5 mass % with respect to the content of the rod-like liquid crystal compound used in combination. Two or more onium salts may be used. In this case, it is preferable that the total content of all the onium salts to be used is in the above-described range.

——Chiral Agent (Optically Active Compound)——

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide (chiral agent having an isosorbide structure), or an isomannide derivative can be used.

In addition, the chiral agent in which back isomerization, dimerization, isomerization, dimerization or the like occurs due to light irradiation such that the helical twisting power (HTP) decreases can also be suitably used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which can initiate a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. These crosslinking agents may be used alone or in combination of two or more kinds.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

——Other Additives——

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

<<Formation of Cholesteric Liquid Crystal Layer>>

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, the above-described liquid crystal composition including the liquid crystal compound and the chiral agent is applied to the alignment film 32 having an alignment pattern corresponding to the above-described liquid crystal alignment pattern in which the direction of the optical axis 40A rotates in at least one in-plane direction.

For the application of the liquid crystal composition, a printing method such as ink jet or scroll printing or a well-known method such as spin coating, bar coating, or spray coating capable of uniformly applying liquid to a sheet-shaped material can be used.

Here, it is preferable that the single period Λ of the liquid crystal alignment pattern is 1.6 μm or less. Therefore, it is preferable that the alignment film 32 also has the alignment film corresponding to the liquid crystal alignment pattern.

The thickness of the coating film of the liquid crystal composition is not particularly limited and may be appropriately set depending on the thickness of the formed cholesteric liquid crystal layer.

Here, in the forming method according to the embodiment of the present invention, a cholesteric liquid crystal layer having a large thickness can be formed by performing the application once. In consideration of this point, it is preferable that the thickness dc of the coating film of the liquid crystal composition exceeds half of the single period Λ of the liquid crystal alignment pattern. That is, it is preferable that the thickness dc of the coating film of the liquid crystal composition satisfies "dc>Λ/2".

After the coating film of the liquid crystal composition is formed, a heating step of heating the liquid crystal composition is performed. Through the heating treatment, the liquid crystal compound 40 is aligned as described above.

The heating treatment is performed at a temperature T1 in a temperature range of a crystal-nematic phase transition temperature (Cr—Ne phase transition temperature) to a nematic-isotropic phase transition temperature (Ne-Iso phase transition temperature) of the liquid crystal compound 40.

In a case where the heating treatment temperature is lower than the Cr—Ne phase transition temperature, there is a problem in that, for example, the liquid crystal compound 40 cannot be appropriately aligned.

In a case where the heating treatment temperature is higher than the Ne-Iso phase transition temperature, there is a problem such as an increase in alignment defects or a decrease in diffraction efficiency.

The heating treatment time is not particularly limited and is preferably 10 to 600 seconds, more preferably 15 to 300 seconds, and still more preferably 30 to 200 seconds.

In order to stably tilt the liquid crystal compound 40 with respect to the main surface in the upper region, that is, in the region spaced from the alignment film 32, it is preferable that one helical pitch, that is, the pitch P is small in a state where the heating treatment ends.

Specifically, with respect to the single period Λ of the liquid crystal alignment pattern, it is preferable that the pitch P satisfies "$P/\Lambda \leq 1.5$" and it is more preferable that the pitch P satisfies "$P/\Lambda \leq 1.2$".

By performing an exposure step of exposing the liquid crystal composition after the end of the heating step, the liquid crystal composition is cured to form the cholesteric liquid crystal layer.

Here, in the forming method, in the exposure step, the liquid crystal composition is exposed while maintaining the temperature of the liquid crystal composition at a temperature of "T1−20° C." or higher. As a result, the cholesteric liquid crystal layer having the above-described liquid crystal alignment pattern in which the liquid crystal compound 40 is tilted with respect to the main surface can be easily formed.

In a case where the temperature of the liquid crystal composition during exposure is lower than "T1−20° C.", there may be a concern in which, for example, the cholesteric liquid crystal layer in which the liquid crystal compound 40 is tilted with respect to the main surface cannot be stably formed or the alignment defects increases.

It is preferable that the temperature of the liquid crystal composition during exposure is the Ne-Iso phase transition temperature or lower.

In the exposure step, the exposure may be performed once. However, it is preferable that a first exposure step is performed after the heating treatment, and subsequently a second exposure step of emitting light having a wavelength different from that of the first exposure step is performed.

By performing the two-step exposure using the chiral agent in which the HTP decreases due to light irradiation, one helical pitch (pitch P) is extended in the first exposure step, and the liquid crystal composition is cured in the second exposure step. As a result, the cholesteric liquid crystal layer having one helical pitch exceeding "$P/\Lambda \leq 1.5$" can be formed, and even in the cholesteric liquid crystal layer having one helical pitch exceeding "$P/\Lambda \leq 1.5$", the liquid crystal compound 40 can be stably tilted with respect to the main surface in the upper region, that is, in the region spaced from the alignment film 32.

By performing the exposure step twice, the cholesteric liquid crystal layer can be controlled to have a configuration where, in a cross-section observed with a SEM, a region where the formation period of the bright portions and the dark portions, that is, the pitch P varies depending on positions in the thickness direction is provided.

Figure 5:
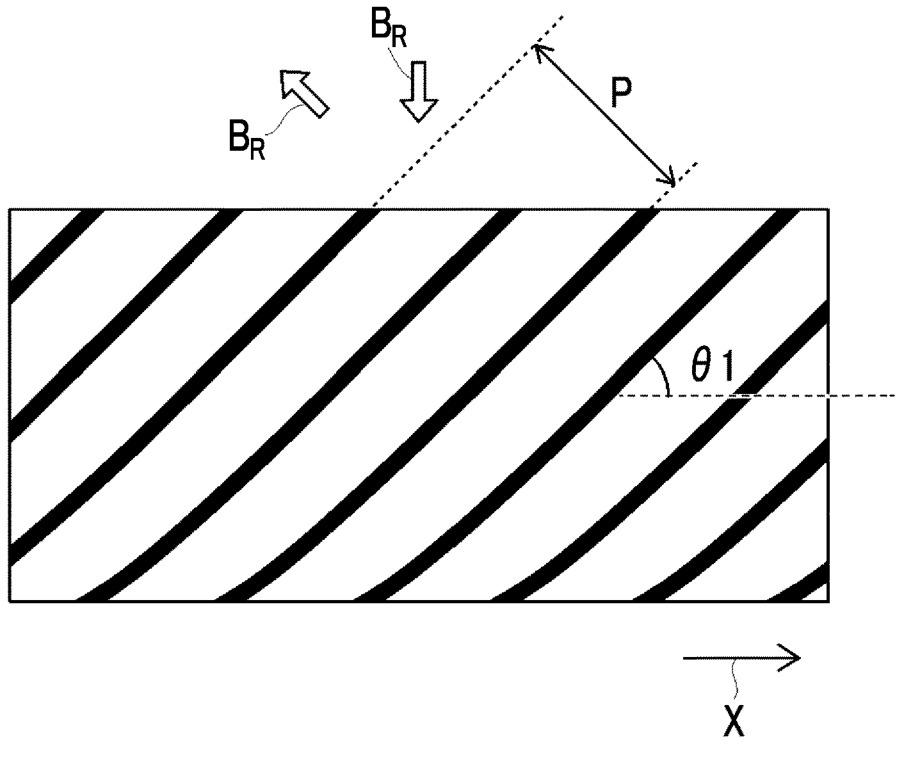
FIG. 5 is a diagram conceptually showing a cross-sectional SEM image of the cholesteric liquid crystal layer of the optical laminate shown in FIG. 2.

In addition, by performing the exposure step twice, the cholesteric liquid crystal layer can be controlled to have a configuration where a region where the tilt angle θ1 of the bright portions and the dark portions varies depending on positions in the thickness direction is provided. The tilt angle θ1 refers to an angle of the bright portions and the dark portions with respect to the main surface of the cholesteric liquid crystal layer as shown in FIG. 5.

It is preferable that the cholesteric liquid crystal layer has a region where the tilt angle θ1 continuously increases in one thickness direction. In the example shown in FIG. 2, it is preferable that the cholesteric liquid crystal layer has a region where the tilt angle θ1 continuously increases from the alignment film 32 side to the side (air side interface A) away from the alignment film 32.

The light used for the exposure is not particularly limited, and it is preferable to use ultraviolet light. The wavelength of irradiated ultraviolet light is preferably 250 to 430 nm.

The total irradiation energy is preferably 2 $mJ/cm^2$ to 50 $J/cm^2$ and more preferably 5 to 1500 $mJ/cm^2$. In order to promote a photopolymerization reaction, the exposure may be performed under heating conditions or in a nitrogen atmosphere.

The formation of the cholesteric liquid crystal layer may be performed using a multiple coating method of repeating the formation of the cholesteric liquid crystal layer.

Hereinabove, the optical laminate, the light guide element, and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

[Preparation of Cholesteric Liquid Crystal Layer 1]

<Formation of Alignment Film>

The following coating liquid for forming an alignment film was applied to a glass substrate by spin coating. The support on which the coating film of the coating liquid for forming an alignment film was formed was dried using a hot plate at 60° C. for 60 seconds. As a result, an alignment film was formed.

Coating Liquid for forming Alignment Film

| | |
|---|---|
| The following material for photo-alignment . . . | 1.00 part by mass |
| Water . . . | 16.00 parts by mass |
| Butoxyethanol . . . | 42.00 parts by mass |
| Propylene glycol monomethyl ether . . . | 42.00 parts by mass |

—Material for Photo-Alignment—

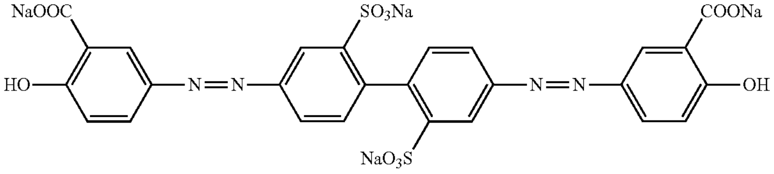

(Exposure of Alignment Film)

The alignment film was exposed using the exposure device shown in FIG. 3 to form an alignment film P-1 having an alignment pattern.

In the exposure device, a laser that emits laser light having a wavelength (325 nm) was used as the laser. The exposure dose of the interference light was 3000 mJ/$cm^2$. The intersecting angle (intersecting angle α) between two beams was 61.0°.

<Formation of Cholesteric Liquid Crystal Layer>

As the liquid crystal composition forming the cholesteric liquid crystal layer 1, the following composition A-1 was prepared. This composition A-1 is a liquid crystal composition forming a cholesteric liquid crystal layer in which the length of one helical pitch (pitch P) in the cholesteric liquid crystalline phase is 300 nm and right circularly polarized light is reflected. The solid content concentration in the composition A-1 was 35 wt %.

Composition A-1

| | |
|---|---|
| Rod-Like liquid Crystal Compound L-1 . . . | 100.00 parts by mass |
| Polymerization initiator I-1 . . . | 3.00 parts by mass |
| Chiral agent Ch-1 . . . | 6.3 parts by mass |
| Methyl ethyl ketone . . . | 202.99 parts by mass |

Rod-Like Liquid Crystal Compound L-1

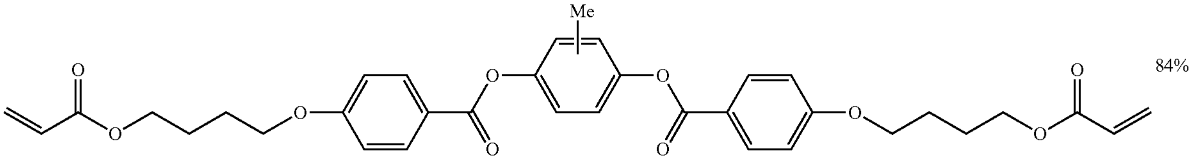

84%

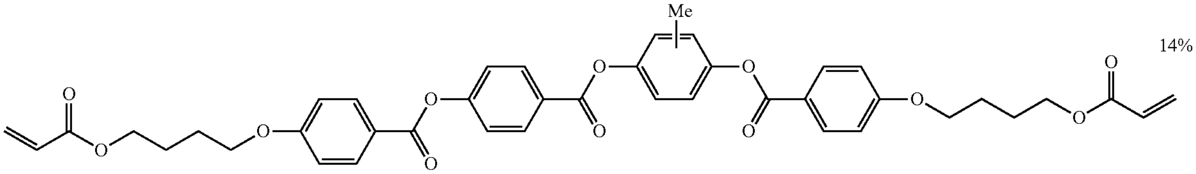

14%

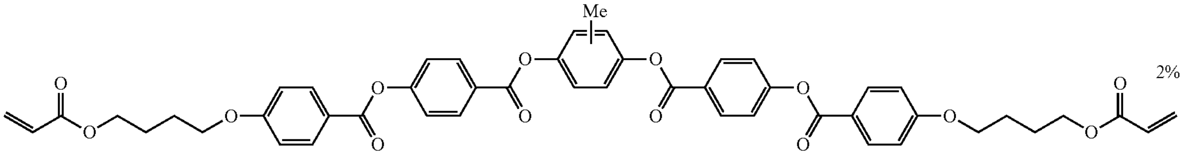

2%

Polymerization Initiator I-1

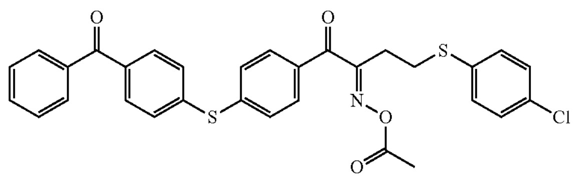 [SMILES: CC(=O)O/N=C(\CCSc1ccc(Cl)cc1)C(=O)c1ccc(Sc2ccc(C(=O)c3ccccc3)cc2)cc1]

Chiral Agent Ch-1

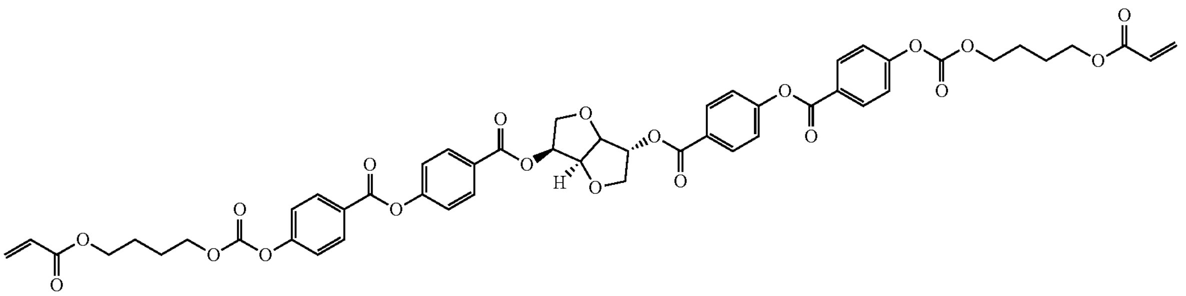 [SMILES: C=CC(=O)OCCCCOC(=O)Oc1ccc(C(=O)Oc2ccc(C(=O)O[C@H]3COC4[C@H]3OC[C@H]4OC(=O)c3ccc(OC(=O)c4ccc(OC(=O)OCCCCOC(=O)C=C)cc4)cc3)cc2)cc1]

The cholesteric liquid crystal layer 1 was formed by applying the composition A-1 to the alignment film P-1.

The following composition A-1 was applied to the alignment film P-1 by spin coating, and the coating film was heated on a hot plate at 80° C. for 120 seconds. Next, the coating film was irradiated with ultraviolet light having a wavelength of 365 nm at an irradiation dose of 500 $mJ/cm^2$ using a high-pressure mercury lamp in a nitrogen atmosphere. As a result, the alignment of the liquid crystal compound was immobilized. The film thickness of the obtained liquid crystal layer was 3.5 μm.

It was verified using a polarization microscope that the cholesteric liquid crystal layer 1 had a periodically aligned surface as shown in FIG. 4. In a case where a cross-section of the coating layer was observed with a SEM, in the liquid crystal alignment pattern of the cholesteric liquid crystal layer 1, the single period Λ over which the optical axis of the liquid crystal compound rotated by 180° was 0.32 μm.

[Preparation of Cholesteric Liquid Crystal Layer 2]

A cholesteric liquid crystal layer 2 was prepared using the same method as that of the cholesteric liquid crystal layer 1, except that the intersecting angle (intersecting angle α) between two beams was 49.2 during the exposure of the alignment film, the amount of the chiral agent in the composition A-1 was changed to 5.3 parts by mass during the formation of the cholesteric liquid crystal layer, and a composition A-2 where the amount of methyl ethyl ketone was changed to 201.13 parts by mass was prepared and used.

This composition A-2 is a liquid crystal composition forming a cholesteric liquid crystal layer in which the length of one helical pitch (pitch P) in the cholesteric liquid crystalline phase is 360 nm and right circularly polarized light is reflected.

The single period Λ of the liquid crystal alignment pattern of the cholesteric liquid crystal layer 2 was 0.39 μm.

[Preparation of Cholesteric Liquid Crystal Layer 3]

A cholesteric liquid crystal layer 3 was prepared using the same method as that of the cholesteric liquid crystal layer 1, except that the intersecting angle (intersecting angle α) between two beams was 42.3 during the exposure of the alignment film, the amount of the chiral agent in the composition A-1 was changed to 4.6 parts by mass during the formation of the cholesteric liquid crystal layer, and a composition A-3 where the amount of methyl ethyl ketone was changed to 199.83 parts by mass was prepared and used.

This composition A-3 is a liquid crystal composition forming a cholesteric liquid crystal layer in which the length of one helical pitch (pitch P) in the cholesteric liquid crystalline phase is 410 nm and right circularly polarized light is reflected.

The single period Λ of the liquid crystal alignment pattern of the cholesteric liquid crystal layer 3 was 0.45 μm.

[Preparation of Cholesteric Liquid Crystal Layer 4]

A cholesteric liquid crystal layer 4 was prepared using the same method as that of the cholesteric liquid crystal layer 2, except that the kind of the chiral agent in the composition A-2 was changed to Ch-2 shown below and the amount of the chiral agent was changed to 3.7 parts by mass during the formation of the cholesteric liquid crystal layer, and a composition A-4 where the amount of methyl ethyl ketone was changed to 198.16 parts by mass was prepared and used.

Chiral Agent Ch-2

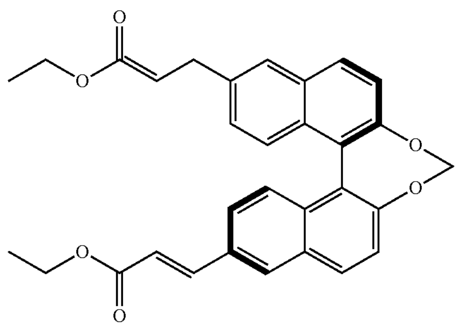

This composition A-4 is a liquid crystal composition forming a cholesteric liquid crystal layer in which the length of one helical pitch (pitch P) in the cholesteric liquid crystalline phase is 360 nm and left circularly polarized light is reflected.

The single period Λ of the liquid crystal alignment pattern of the cholesteric liquid crystal layer 4 was 0.39 μm.

Example 1

An optical laminate was prepared by laminating the cholesteric liquid crystal layer 1, the cholesteric liquid crystal layer 4, and the cholesteric liquid crystal layer 3 in this order. Further, the obtained optical laminate was bonded to a glass plate having a thickness of 1 mm to prepare a light guide element. In this case, a direction of each of the layers was set such that a tilt direction of a periodic surface satisfied the relationship shown in FIG. 11. That is, the cholesteric liquid crystal layer 4 was bonded to the cholesteric liquid crystal layers 1 and 3 in a state where it was reversed upside down. For bonding of the respective layers, an optical adhesive sheet (Opteria, manufactured by Lintec Corporation) was used.

Comparative Example 1

An optical laminate was prepared by laminating the cholesteric liquid crystal layer 1, the cholesteric liquid crystal layer 2, and the cholesteric liquid crystal layer 3 in this order. Further, the obtained optical laminate was bonded to a glass plate having a thickness of 1 mm to prepare a light guide element. For bonding of the respective layers, an optical adhesive sheet (Opteria, manufactured by Lintec Corporation) was used.

[Evaluation]

Regarding the light guide element prepared in each of Examples and Comparative Examples, whether or not crosstalk occurred was evaluated using the following method.

—Crosstalk—

An image was projected to the light guide element using a LCOS projector and was evaluated by visual inspection at an observation position. A case where multiple images caused by crosstalk was able to be clearly recognized was evaluated as "B", and a case where multiple images were reduced was evaluated as "A".

The results and the specification of the optical laminates are shown in the following table.

TABLE 1

| | Liquid Crystal Composition Chiral Agent | | | | | |
|---|---|---|---|---|---|---|
| | Kind | Amount Part(s) by Mass | Film Thickness d μm | In-Plane Period Λ μm | Helical Period P μm | Polarized Light Selectivity |
| Cholesteric Liquid Crystal Layer 1 | Ch-1 | 6.3 | 3.5 | 0.32 | 300 | Right Circularly Polarized Light |
| Cholesteric Liquid Crystal Layer 2 | Ch-1 | 5.3 | 3.5 | 0.39 | 360 | Right Circularly Polarized Light |
| Cholesteric Liquid Crystal Layer 3 | Ch-1 | 4.6 | 3.5 | 0.45 | 410 | Right Circularly Polarized Light |
| Cholesteric Liquid Crystal Layer 4 | Ch-2 | 3.7 | 3.5 | 0.39 | 360 | Left Circularly Polarized Light |

TABLE 2

| | Configuration | | | |
|---|---|---|---|---|
| | First Cholesteric Liquid Crystal Layer | Second Cholesteric Liquid Crystal Layer | Third Cholesteric Liquid Crystal Layer | Evaluation Crosstalk |
| Comparative Example 1 | Cholesteric Liquid Crystal Layer 1 | Cholesteric Liquid Crystal Layer 2 | Cholesteric Liquid Crystal Layer 3 | B |
| Example 1 | Cholesteric Liquid Crystal Layer 1 | Cholesteric Liquid Crystal Layer 4 | Cholesteric Liquid Crystal Layer 3 | A |

As can be seen from the above results, the effects of the present invention are obvious.

The present invention is suitably applicable to various uses where light is reflected in an optical device, for example, a diffraction element that causes light to be incident into a light guide plate of AR glasses or emits light to the light guide plate.

EXPLANATION OF REFERENCES

10: image display apparatus
12: display element
14, 14*a*, 14*b*: optical laminate
16: light guide plate
20: display
24: projection lens
30: support
32, 32R, 32G, 32B: alignment film
34: cholesteric liquid crystal layer
34R: R reflection cholesteric liquid crystal layer
34G: G reflection cholesteric liquid crystal layer
34B: B reflection cholesteric liquid crystal layer
40: liquid crystal compound
40A: optical axis
60: exposure device
62: laser
64: light source
65: λ/2 plate
68: polarization beam splitter
70*a*, 70B: mirror
72A, 72B: λ/4 plate
$B_R$: blue right circularly polarized light
$G_R$: green right circularly polarized light
$G_L$: green left circularly polarized light
$R_R$: red right circularly polarized light
M: laser light
MA, MB: beam
MP: P polarized light
MS: S polarized light
$P_O$: linearly polarized light
$P_R$: right circularly polarized light
$P_L$: left circularly polarized light
U: user

What is claimed is:

1. An optical laminate comprising:

a first cholesteric liquid crystal layer and a second cholesteric liquid crystal layer that are obtained by immobilizing a cholesteric liquid crystalline phase and have a liquid crystal alignment pattern in which a direction of an optical axis derived from a liquid crystal compound changes while continuously rotating in at least one in-plane direction, wherein the first cholesteric liquid crystal layer and the second cholesteric liquid crystal layer are laminated, in the first cholesteric liquid crystal layer and the second cholesteric liquid crystal layer, turning directions of circularly polarized light to be reflected are opposite to each other, helical pitches as lengths in a thickness direction over which the liquid crystal compound that is helically turned and laminated in the cholesteric liquid crystalline phase turns by 360° are different from each other, rotation directions of the direction of the optical axis derived from the liquid crystal compound that continuously rotates in at least the one in-plane direction in the liquid crystal alignment pattern are opposite to each other, in a case where a helical pitch of the first cholesteric liquid crystal layer is represented by $P_1$ and a helical pitch of the second cholesteric liquid crystal layer is represented by $P_2$, $P_1<P_2$, in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, a length of the single period of the first cholesteric liquid crystal layer is represented by $\Lambda_1$, and a length of the single period of the second cholesteric liquid crystal layer is represented by $\Lambda_2$, $\Lambda_1<\Lambda_2$, the optical laminate does not have a cholesteric liquid crystal layer which has the same helical pitch as the first cholesteric liquid crystal layer and in which the turning direction of circularly polarized light to be reflected is opposite from that of the first cholesteric liquid crystal layer, and the optical laminate does not have a cholesteric liquid crystal layer which has the same helical pitch as the second cholesteric liquid crystal layer and in which the turning direction of circularly polarized light to be reflected is opposite from that of the second cholesteric liquid crystal layer.

2. The optical laminate according to claim 1, further comprising:

a third cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction, wherein the first cholesteric liquid crystal layer, the second cholesteric liquid crystal layer, and the third cholesteric liquid crystal layer are laminated, in the first and third cholesteric liquid crystal layers and the second cholesteric liquid crystal layer, turning directions of circularly polarized light to be reflected are opposite to each other, helical pitches as lengths in a thickness direction over which the liquid crystal compound that is helically turned and laminated in the cholesteric liquid crystalline phase turns by 360° are different from each other, rotation directions of the direction of the optical axis derived from the liquid crystal compound that continuously rotates in at least one in-plane direction in the liquid crystal alignment pattern are opposite to each other, in a case where a helical pitch of the third cholesteric liquid crystal layer is represented by $P_3$, $P_1<P_2<P_3$, and in a case where a length of the single period of the third cholesteric liquid crystal layer is represented by $\Lambda_3$, $\Lambda_1<\Lambda 2<\Lambda_3$, the optical laminate does not have a cholesteric liquid crystal layer which has the same helical pitch as the third cholesteric liquid crystal layer and in which the turning direction of circularly polarized light to be reflected is opposite from that of the third cholesteric liquid crystal layer.

3. The optical laminate according to claim 2, wherein in each of the liquid crystal alignment pattern of the first cholesteric liquid crystal layer, the liquid crystal alignment pattern of the second cholesteric liquid crystal layer, and the liquid crystal alignment pattern of the third cholesteric liquid crystal layer, the direction of the optical axis derived from the liquid crystal compound changes while continuously rotating only in one in-plane direction, and in the liquid crystal alignment pattern of the first cholesteric liquid crystal layer, the liquid crystal alignment pattern of the second cholesteric liquid crystal layer, and the liquid crystal alignment pattern of the third cholesteric liquid crystal layer, the one in-plane directions are the same.

4. A light guide element comprising:

a light guide plate; and the optical laminate according to claim 3 that is provided on the light guide plate.

5. An image display apparatus comprising:

the light guide element according to claim 4; and a display element that emits an image to the optical laminate of the light guide element.

6. The image display apparatus according to claim 5, wherein the display element emits circularly polarized light to the optical laminate.

7. The optical laminate according to claim 2, wherein in the liquid crystal alignment pattern of the first cholesteric liquid crystal layer and the liquid crystal alignment pattern of the second cholesteric liquid crystal layer, the direction of the optical axis derived from the liquid crystal compound changes while continuously rotating only in one in-plane direction, and in the liquid crystal alignment pattern of the first cholesteric liquid crystal layer and the liquid crystal alignment pattern of the second cholesteric liquid crystal layer, the one in-plane directions are the same.

8. A light guide element comprising:

a light guide plate; and the optical laminate according to claim 2 that is provided on the light guide plate.

9. An image display apparatus comprising:

the light guide element according to claim 8; and a display element that emits an image to the optical laminate of the light guide element.

10. The image display apparatus according to claim 9, wherein the display element emits circularly polarized light to the optical laminate.

11. The image display apparatus according to claim 10, wherein the display element emits circularly polarized light having a turning direction that varies depending on display colors to the optical laminate.

12. The optical laminate according to claim 1, wherein in the liquid crystal alignment pattern of the first cholesteric liquid crystal layer and the liquid crystal alignment pattern of the second cholesteric liquid crystal layer, the direction of the optical axis derived from the liquid crystal compound changes while continuously rotating only in one in-plane direction, and in the liquid crystal alignment pattern of the first cholesteric liquid crystal layer and the liquid crystal alignment pattern of the second cholesteric liquid crystal layer, the one in-plane directions are the same.

13. A light guide element comprising:

a light guide plate; and the optical laminate according to claim 12 that is provided on the light guide plate.

14. An image display apparatus comprising:

the light guide element according to claim 13; and a display element that emits an image to the optical laminate of the light guide element.

15. The image display apparatus according to claim 14, wherein the display element emits circularly polarized light to the optical laminate.

16. The image display apparatus according to claim 15, wherein the display element emits circularly polarized light having a turning direction that varies depending on display colors to the optical laminate.

17. A light guide element comprising:

a light guide plate; and the optical laminate according to claim 1 that is provided on the light guide plate.

18. An image display apparatus comprising:

the light guide element according to claim 17; and a display element that emits an image to the optical laminate of the light guide element.

19. The image display apparatus according to claim 18, wherein the display element emits circularly polarized light to the optical laminate.

20. The image display apparatus according to claim 19, wherein the display element emits circularly polarized light having a turning direction that varies depending on display colors to the optical laminate.

* * * * *